(12) United States Patent
Arifuku

(10) Patent No.: US 10,992,835 B2
(45) Date of Patent: Apr. 27, 2021

(54) IMAGE READING DEVICE, IMAGE FORMING DEVICE, AND CONTROL METHOD CAPABLE OF REDUCING USER BURDEN IN CASE OF READ ERROR

(71) Applicant: SHARP KABUSHIKI KAISHA, Sakai (JP)

(72) Inventor: Naoya Arifuku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/686,568

(22) Filed: Nov. 18, 2019

(65) Prior Publication Data

US 2020/0162630 A1 May 21, 2020

(51) Int. Cl.
| | |
|---|---|
| *H04N 1/00* | (2006.01) |
| *H04N 1/047* | (2006.01) |
| *G03G 15/00* | (2006.01) |
| *G06K 15/02* | (2006.01) |
| *H04N 1/107* | (2006.01) |
| *H04N 1/23* | (2006.01) |
| *H04N 1/195* | (2006.01) |

(52) U.S. Cl.
CPC ......... *H04N 1/047* (2013.01); *H04N 1/00013* (2013.01); *H04N 1/00037* (2013.01); *H04N 1/00074* (2013.01); *G03G 15/6567* (2013.01); *G06K 15/1852* (2013.01); *H04N 1/00135* (2013.01); *H04N 1/00594* (2013.01); *H04N 1/00681* (2013.01); *H04N 1/00718* (2013.01); *H04N 1/107* (2013.01); *H04N 1/19573* (2013.01); *H04N 1/2392* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2005/0162713 A1* | 7/2005 | Song | ................... | H04N 1/00822 358/474 |
| 2011/0075168 A1* | 3/2011 | Ikari | .................... | H04N 1/3878 358/1.9 |
| 2011/0228285 A1* | 9/2011 | Kohara | .............. | H04N 1/00493 358/1.2 |
| 2014/0118796 A1* | 5/2014 | Isaev | ................... | H04N 1/00018 358/451 |

FOREIGN PATENT DOCUMENTS

JP        2015-056794 A        3/2015

\* cited by examiner

*Primary Examiner* — Haris Sabah

(74) *Attorney, Agent, or Firm* — ScienBiziP, P.C.

(57) ABSTRACT

An image forming device includes a CPU. The CPU causes an image reader to collectively read a plurality of documents placed in each divided area of a document placement table and acquire individual images according to a user operation. Furthermore, the CPU generates, for each divided area, an image file that includes the image. In addition, if document reading is executed in a state where a document is placed in an inappropriate position, a notification screen for notifying the user that the document is not appropriately placed is displayed on a display before the image file data is generated.

4 Claims, 18 Drawing Sheets

FIRST TIME

SECOND TIME

IMAGE READING DEVICE, IMAGE FORMING DEVICE, AND CONTROL METHOD CAPABLE OF REDUCING USER BURDEN IN CASE OF READ ERROR

BACKGROUND OF THE INVENTION

Field of the Invention

The present invention relates to an image reading device, an image forming device, and a control method. In particular, for example, the present invention relates to an image reading device, an image forming device, a non-transitory computer-readable recording medium storing a control program, and a control method which generate, for each area dividing a read area of a document placement table, an image file from the image obtained by reading the document placed in each area.

Description of the Background Art

Japanese Unexamined Patent Application Publication No. 2015-056794 discloses an example of an information processing device of the background art. In the information processing device of the background art, a front business card image obtained by reading the front of a business card and a back business card image obtained by reading the back of the business card are used to determine whether or not the front and back business card images are the same image. Then, if the probability is high that the front business card image and the back business card image are the same image, a notifying image indicating this is displayed on an operation panel.

However, even though the information processing device of the background art is capable of notifying that the user has forgotten to turn over the document, it is unable to detect and issue notifications for other read errors. Therefore, when a read error other than forgetting to turn over the document occurs, the error cannot be confirmed until after the image data is saved, or until after the image data is transmitted to the outside. This creates user burden, and is inconvenient.

Therefore, a main object of the present invention is to provide a new image reading device, image forming device, and control method.

Another object of the present invention is to provide an image reading device, an image forming device, and a control method which are capable of reducing user burden when a read error occurs.

SUMMARY OF THE INVENTION

One aspect of the invention is an image reading device including a generator, an extractor, a first determiner, and a notifier. The generator divides a read area of a document placement table into a plurality of areas, executes read processing that collectively reads an image of a document in each area, and generates a whole image that corresponds to a whole of the plurality of areas. The extractor extracts an individual image corresponding to the document from the whole image. The first determiner determines, according to a relationship between each of the plurality of areas and a position of the individual image, whether or not a document corresponding to the individual image is appropriately placed. The notifier notifies a user that a document is not appropriately placed if the first determiner determines that the document is not appropriately placed.

Another aspect of the invention is an image reading device belonging to the above aspect of the invention, wherein the first determiner determines, according to the relationship between each of the plurality of areas and the position of the individual image, whether or not a document corresponding to the individual image is placed straddling two or more areas of the plurality of areas, and the notifier notifies a user that a document is placed straddling two or more areas if the first determiner determines that the document is placed straddling two or more areas.

Still another aspect of the invention is an image reading device belonging to one of the above aspects of the invention, wherein the first determiner determines, according to the relationship between each of the plurality of areas and the position of the individual image, whether or not there is an area where two or more documents are placed among the plurality of areas, and the notifier notifies a user that there is an area where two or more documents are placed if the first determiner determines that there is the area where two or more documents are placed.

Still another aspect of the invention is an image reading device including a whole image generator, an extractor, an image file generator, a second determiner, and a notifier. The whole image generator divides a read area of a document placement table into a plurality of areas, multiple times executes read processing that collectively reads an image of a document in each area, and generates a whole image that corresponds to a whole of the plurality of areas in each read processing. The extractor extracts an individual image corresponding to the document from the whole image. The image file generator generates a plurality of image files in which a plurality of individual images acquired by executing each read processing are collected by areas. The second determiner determines, based on the plurality of individual images acquired by executing each read processing and collected by areas, whether or not there is an area among the plurality of areas, in which document characteristics have changed in each read processing. The notifier notifies a user that there is an area in which document characteristics have changed in each read processing if the second determiner determines that there is the area in which the document characteristics have changed in each read processing.

Still another aspect of the invention is an image reading device belonging to the immediately preceding aspect of the invention. The second determiner determines, based on a number of individual images for each area included in the plurality of image files, whether or not there is an area among the plurality of areas, in which a number of documents has changed in each read processing, and the notifier notifies a user that there is an area in which a number of documents has changed in each read processing if the second determiner determines that there is the area in which the number of documents has changed in each read processing.

Still another aspect of the invention is an image reading device according to the same preceding aspect of the invention, wherein the second determiner determines, based on a size of the individual images for each area included in the plurality of image files, whether or not there is a document whose size has changed in each read processing, and the notifier notifies a user that there is a document whose size has changed if the second determiner determines that there is the document whose size has changed.

Still another aspect of the invention is an image forming device including an image reading device belonging to any one of the above aspects of the inventions.

Still another aspect of the invention is a control method of an image reading device that divides a read area of a document placement table into a plurality of areas, executes read processing that collectively reads an image of a document in each area, and generates a whole image that corresponds to a whole of the plurality of areas, the control method including (a) extracting an individual image corresponding to the document from the whole image, (b) determining, according to a relationship between each of the plurality of areas and a position of the individual image, whether or not a document corresponding to the individual image is appropriately placed, and (c) notifying a user that a document is not appropriately placed if it is determined that the document is not appropriately placed.

Still another aspect of the invention is a control method of an image reading device that divides a read area of a document placement table into a plurality of areas, multiple times executes read processing that collectively reads an image of a document in each area, and generates a whole image that corresponds to a whole of the plurality of areas in each read processing, the control method including (a) extracting an individual image corresponding to the document from the whole image (b) generating a plurality of image files in which a plurality of individual images acquired by executing each read processing are collected by areas, (c) determining, based on the plurality of individual images acquired by executing each read processing and collected by areas, whether or not there is an area among the plurality of areas, in which document characteristics have changed in each read processing, and (d) notifying a user that there is an area in which document characteristics have changed in each read processing if it is determined that there is the area in which the document characteristics have changed in each read processing.

According to the present invention, it is possible to reduce user burden when a read error occurs.

The object above, other objects, features and advantages of the present invention will become more apparent from the detailed description of the following embodiments given with reference to the drawings.

DESCRIPTION OF THE PREFERRED EMBODIMENTS

First Embodiment

Figure 1:
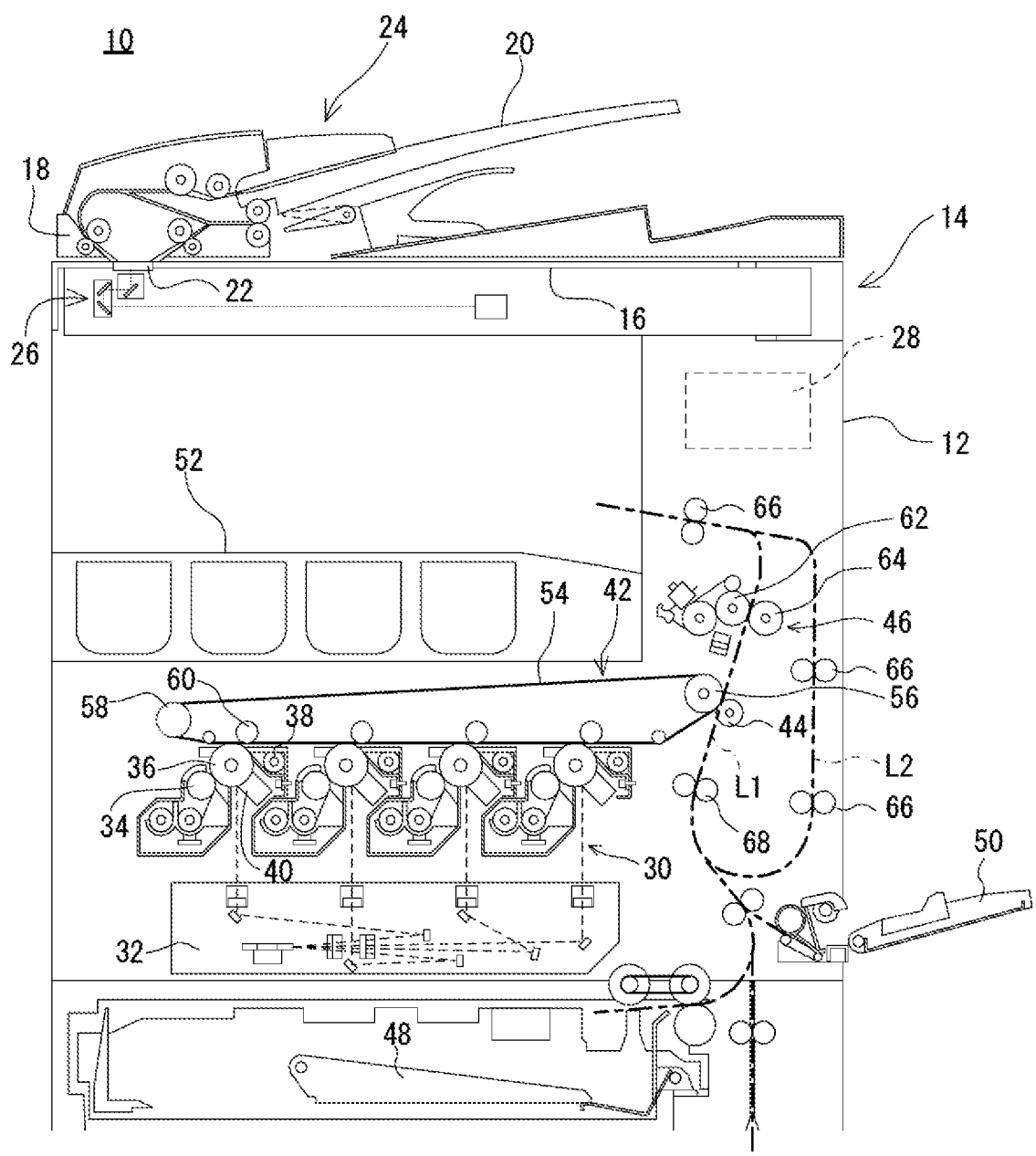
FIG. 1 is a perspective view showing the external appearance of an image forming device, which is an embodiment of the present invention.

Referring to FIG. 1, an image reading device 14, which is a first embodiment of the present invention, is used in an image forming device 10 which forms an image on a paper sheet by an electrophotographic method. First, a basic configuration of the image forming device 10 will be schematically described. In the present embodiment, the image forming device 10 is a multifunction peripheral (MFP) which includes a copy function, a printer function, a scanner function, a facsimile function, and the like.

As shown in FIG. 1, the image forming device 10 includes a device body 12 provided with an image former 30 and the like, and an image reading device 14 disposed above the device body 12.

The image reading device 14 includes a document placement table 16 formed of a transparent material such as platen glass. A document holding cover 18 is attached to the top of the document placement table 16 such that it is capable of being freely opened and closed via a hinge or the like. The document holding cover 18 is provided with an automatic document feeder (ADF) 24 that automatically feeds a document placed on a document placement tray 20 one sheet at a time to an image reading position 22. Although not shown, the lower surface of the document holding cover 18 (that is to say, the surface facing the upper surface of the document placement table 16) is provided with a white holding plate, which takes the form of a thin rectangular plate, in a position facing the document placement table 16. Further, although not shown, the front side of the document placement table 16 is provided with an operation unit (operation panel) including a touch panel 98 and operation buttons 102 and the like, which accept user input operations such as a print instruction.

Furthermore, built into the image reading device 14 are image reader 26, which includes a light source, a plurality of mirrors, an imaging lens, a line sensor, and the like. The image reader 26 exposes the surface of the document with the light source, and guides the reflected light from the surface of the document to the imaging lens by plurality of mirrors. Then, the reflected light is imaged on a light-receiving element of the line sensor by the imaging lens. The line sensor detects the luminance and the chromaticity of the reflected light imaged on the light-receiving element, and generates image data based on the image on the document surface. A charge coupled device (CCD), a contact image sensor (CIS), or the like is used as the line sensor.

A scanning unit including a light source and a plurality of mirrors is fixedly positioned below the image reading position 22 when reading a document fed by the ADF 24, and moves in a secondary scanning direction when reading a document placed on the document placement table 16. Note that the secondary scanning direction is the left-and-right direction when the image forming device 10 is viewed from the front, that is to say, the left-and-right direction in FIG. 1. Furthermore, the primary scanning direction is the front-and-rear direction of the image forming device 10 when the image forming device 10 is viewed from the front, that is to say, the direction in FIG. 1 which is perpendicular to the page surface.

Built into the device body 12 are a controller 28, which includes a central processing unit (CPU) 80 as described below, memory (a random access memory (RAM) 84 and a hard disk drive (HDD) 86), and the like, and an image former 30 (see FIG. 2). The controller 28 transmits control signals to the components of the image forming device 10 according to input operations performed with respect to an operation unit, such as a touch panel 98, and causes the image forming device 10 to execute various operations. Because the controller 28 controls the whole of the image forming device 10, it also serves as a control device of the image reading device 14.

The image former 30 includes an exposure unit 32, a developer 34, a photosensitive drum 36, a clean unit 38, a charger 40, an intermediate transfer belt unit 42, a transfer roller 44, a fixing unit 46, and the like. An image is formed on a paper sheet transported from a sheet feeding tray 48 or a manual sheet feeding tray 50, and the paper sheet is discharged from a paper discharge tray 52 following image formation. Image data read by the image reader 26, image data transmitted from an external computer, or the like, is used as the image data for forming image on the paper sheet.

The image data handled by the image forming device 10 corresponds to a four-color image using black (K), cyan (C), magenta (M), and yellow (Y). Consequently, four developers 34, photosensitive drums 36, clean units 38 and chargers 40 respectively corresponding to each of the colors, are provided such that four types of latent images are formed. These constitute four image stations.

The photosensitive drum 36 is an image carrier in which a photosensitive layer is formed on the surface of a conductive cylindrical substrate. The charger 40 is a member that charges the surface of the photosensitive drum 36 to a predetermined potential. Furthermore, the exposure unit 32 is configured as a laser scanning unit (LSU) including a laser emitting portion and a reflection mirror and the like, and exposes the surface of the charged photosensitive drum 36 such that an electrostatic latent image corresponding to the image data is formed on the surface of the photosensitive drum 36. The developer 34 visualizes the electrostatic latent image formed on the surface of the photosensitive drum 36 with the four toner colors (YMCK). Moreover, the clean unit 38 removes residual toner from the surface of the photosensitive drum 36 after development and image transfer.

The intermediate transfer belt unit 42 includes an intermediate transfer belt 54, a driving roller 56, a driven roller 58, four intermediate transfer rollers 60, and the like, and is disposed above the photosensitive drum 36. The intermediate transfer belt 54 is provided to contact with each of the photosensitive drums 36, and the toner images of each color formed on the photosensitive drums 36 are sequentially superimposed on the intermediate transfer belt 54 using the intermediate transfer roller 60. As a result, a multicolor toner image is formed on the intermediate transfer belt 54. Furthermore, the transfer roller 44 is provided such that the intermediate transfer belt 54 is pressed between the transfer roller 44 and the driving roller 56. The toner image formed on the intermediate transfer belt 54 is transferred to a paper sheet as a result of the paper sheet passing through a transfer nip portion between the intermediate transfer belt 54 and the transfer roller 44.

The fixing unit 46 includes a heat roller 62 and a pressure roller 64, and is disposed above the transfer roller 44. The heat roller 62 is set such that it becomes a predetermined fixing temperature. As a result of the paper sheet passing through a nip area between the heat roller 62 and the pressure roller 64, the toner image transferred to the paper sheet is melted, mixed, and pressed, and the toner image is thermally fixed to the paper sheet.

A first paper sheet transport path L1 for feeding a paper sheet from the sheet feeding tray 48 or the manual sheet feeding tray 50 to the paper discharge tray 52 via a registration roller 68, the transfer roller 44, and the fixing unit 46 is formed inside the device body 12 described above. Furthermore, a second paper sheet transport path L2 is formed for returning the paper sheet to the upstream side of the transfer roller 44 in the paper sheet transport direction of the first paper sheet transport path L1 at the time double-sided printing is performed with respect to the paper sheet after completion of single-sided printing, and after the paper sheet has passed through the fixing unit 46. A plurality of transport rollers 66 for transporting the paper sheet in the paper sheet transport direction is appropriately provided to the first paper sheet transport path L1 and the second paper sheet transport path L2.

When single-sided printing (image formation) is performed in the device body 12, paper sheets are guided one at a time from the sheet feeding tray 48 or the manual sheet feeding tray 50 to the first paper sheet transport path L1, and then transported by the transport rollers provided to the first paper sheet transport path L1 up to the registration roller 68. Further, the paper sheet is transported by the registration roller 68 to the transfer roller 44 (transfer nip portion) at a timing in which the leading end of the paper sheet and the leading end of the image information on the intermediate transfer belt 54 are aligned, causing the toner image to be transferred onto the paper sheet. Then, the unfixed toner on the paper sheet is thermally melted and fixed as a result of passing through the fixing unit 46 (fixing nip portion), and the paper sheet is discharged onto the paper discharge tray 52.

On the other hand, at the time double-sided printing is performed, when the trailing end portion of the paper sheet reaches a transport roller 66 in the vicinity of the paper discharge tray 52 after completion of single-sided printing and after passing through the fixing unit 46, the paper sheet is reversed and guided onto the second paper sheet transport path L2 by rotating the transport rollers 66 in reverse. After being guided onto the second paper sheet transport path L2, the paper sheet is transported along the second paper sheet transport path L2 by the transport rollers 66, and is then guided onto the first paper sheet transport path L1 on the upstream side of the registration roller 68 in the paper sheet transport direction. Because the front and back of the paper sheet are reversed at this time, printing is performed with respect to the back side of the paper sheet as a result of the paper sheet passing through the transfer roller 44 and the fixing unit 46.

Figure 2:
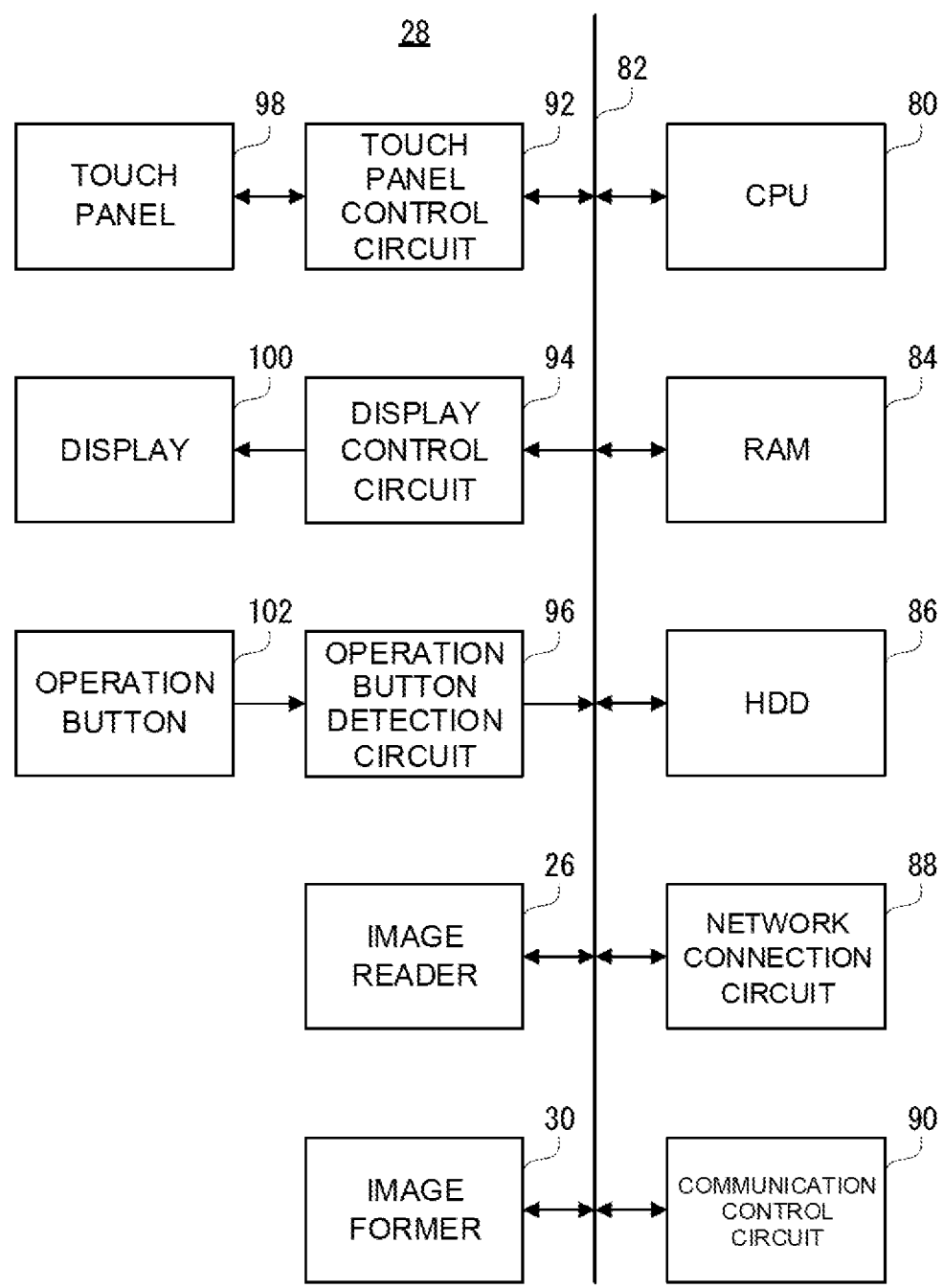
FIG. 2 is a block diagram showing an electrical configuration of the image forming device shown in FIG. 1.

FIG. 2 is a block diagram showing an electrical configuration of the image forming device 10 shown in FIG. 1. Referring to FIG. 2, the image forming device 10 includes a CPU 80. The CPU 80 is connected via a bus 82 to a RAM 84, an HDD 86, a network connection circuit 88, a communication control circuit 90, a touch panel control circuit 92, a display control circuit 94, an operation button detection circuit 96, an image reader 26, and an image former 30. Furthermore, the touch panel control circuit 92 is connected to a touch panel 98. The display control circuit 94 is connected to a display 100. The operation button detection circuit 96 is connected to operation buttons 102.

The CPU 80 performs the overall control of the image forming device 10. The RAM 84 is used as a work area and a buffer area of the CPU 80. The HDD 86 is the primary storage device of the image forming device 10, and stores various programs for controlling the operation of the image forming device 10, stores image data transmitted from an external computer via the network connection circuit 88, stores image data read by the image reader 26, and stores image data received from the network connection circuit 88 or the communication control circuit 90.

The network connection circuit 88 is a communication circuit for connecting to a network such as a LAN or the Internet, and communicates with external computers according to instructions from the CPU 80 using a protocol such as TCP/IP.

The communication control circuit 90 is a modem which is connected to a communication line such as a telephone line, and transmits and receives image data with respect to a facsimile of a communication partner according to instructions from the CPU 80. The image data received from the facsimile of the communication partner is temporarily stored in the HDD 86.

The touch panel control circuit 92 applies the necessary voltage and the like to the touch panel 98. It also detects touch operations (touch inputs) inside a touch effective area of the touch panel 98, and outputs touch coordinate data indicating the positions of the touch inputs to the CPU 80.

The touch panel 98 is a general-purpose touch panel, and an arbitrary type such as an electrostatic capacitance-type, electromagnetic induction-type, resistance film-type, or infrared-type touch panel may be used. In the first embodiment, an electrostatic capacitance-type touch panel is used as the touch panel 98. The touch panel 98 is provided on the display surface of the display 100. Note that a touch panel display, in which the touch panel 98 and the display 100 are integrally formed, may also be used.

The display control circuit 94 includes a graphics processing unit (GPU), video random access memory (VRAM), and the like. The GPU, under instructions from the CPU 80, uses image generation data stored in the RAM 84 to generate display image data in the VRAM for displaying various screens on the display 100, and outputs the generated display image data to the display 100. For example, a liquid crystal display (LCD) or an electro-luminescence (EL) display can be used as the display 100.

The operation button detection circuit 96 outputs operation signals or operation data to the CPU 80 in response to operations performed with respect to the operation buttons 102. The operation buttons 102 are hardware buttons or switches such as a power button, and are, for example, provided on the upper surface or side surfaces of the device body 12.

The image reading device 14 (image forming device 10) described above is provided with a multicrop scanning function. Here, the multicrop scanning function refers to a function that collectively reads a plurality of documents placed on the document placement table 16, cuts out images that correspond to each of the plurality of documents, and generates individual image data.

For a specific example of a method of cutting out images corresponding to documents from an image read by the image reader 26, refer to Japanese Unexamined Patent Application Publication No. 2018-133691 filed by the present applicant. To briefly describe the method, a document is read in a state where the document holding cover 18 is closed. Then, the boundary (edges) of each document is recognized based on the contrast in the shade or hue between the edge portion of the document and the area outside the document (the holding plate of the document holding cover 18), and the images are cut out along these edges. Note that the holding plate of the document holding cover 18 is white. Therefore, in the case of a document in which the base color is white, an image for edge detection, which has adjusted gradation characteristics such that differences in density are emphasized, is generated based on the image read by the image reader 26. Then, the edges of each document are recognized based on the image for edge detection.

Furthermore, documents may also be read in a state where the document holding cover 18 is open. In addition, a black (or other color except for white) mat for use as a background may also be placed to cover the documents placed on the document placement table 16. In this method, sections of the image outside the documents become black, and images corresponding to the documents can be cut out due to the difference in contrast with the sections of the image corresponding to the documents.

Note that the method of reading documents in a state where the document holding cover 18 is closed may be preferably used in those cases where documents such as photographs having a base color other than white are read. Furthermore, the method of reading documents in a state where the document holding cover 18 is open and the method of reading documents by placing a mat for use as a background may be preferably used in those cases where documents such as business cards having a base color of white, or a color close to white, are read.

Figure 3:
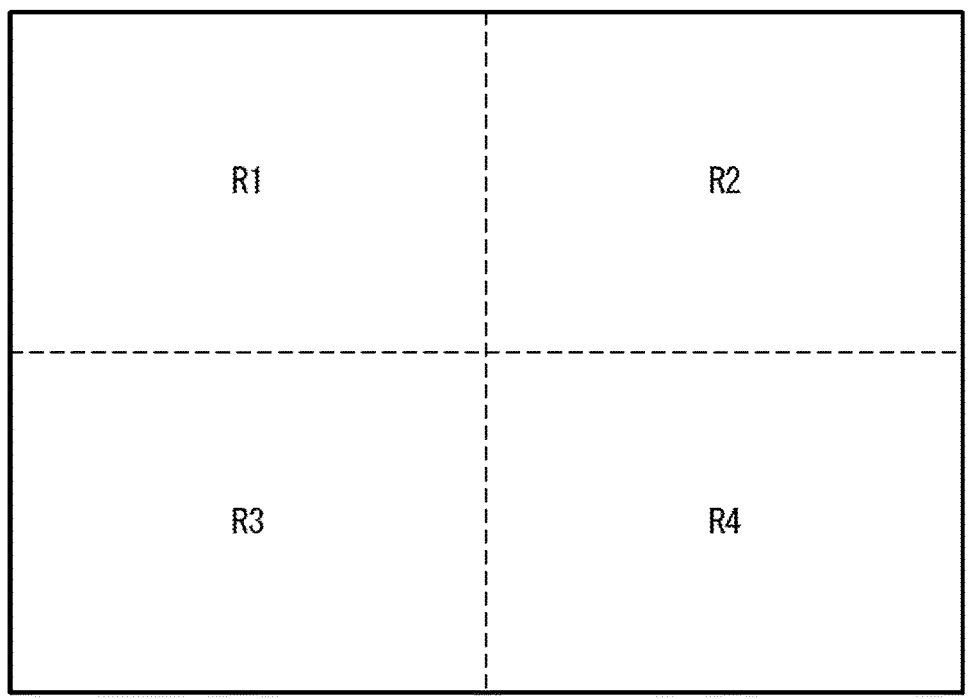
FIG. 3 is a diagram for describing divided areas that divide the read area of the image reading device shown in FIG. 1.

FIG. 3 is a diagram for describing an example in which the read area 200 of the document placement table 16 is divided into a plurality of areas (in the first embodiment, the four divided areas R1, R2, R3, and R4). The read area 200 represents the entire area of the document placement table 16 which is capable of reading a document. In FIG. 3, the read area 200 is divided using dotted lines in order to show the areas R1 to R4 after being divided (hereinafter referred to as "divided areas"). However, in reality, such dotted lines are not displayed. For example, when the multicrop scanning function is executed, the user sets a mode that uses the function (hereinafter, sometimes referred to as "multicrop mode") on a setting screen. At this time, an image showing that the read area 200 is divided as shown in FIG. 3 is displayed on the setting screen.

The image reading device 14 (image forming device 10) according to the first embodiment performs a scan using the multicrop scanning function to acquire an image of the documents. After image data is generated corresponding to the acquired image of the documents, it is associated with each of the divided areas R1 to R4. Then, the generated image data is stored in a storage medium.

A document contains an image on the surface including at least one of text, a graphic, or a photograph, and a typical example is a business card or a postcard. Furthermore, according to the first embodiment, the storage medium is the HDD 86 included in the image forming device 10. Note that the storage medium may also be an external storage medium installed to the image forming device 10 or an HDD included in an external computer which is connected to the image forming device 10 via the network connection circuit 88. A USB memory or the like may be used as the external storage medium.

Here, the specific operation of the image reading device 14 (image forming device 10) in the multicrop mode will be described. First, the user of the image reading device 14 operates an operation panel, which is constituted by the touch panel 98 and the display 100 of the image forming device 10, and sets the multicrop mode on a setting screen. After setting the multicrop mode, the user sets a document on the document placement table 16 of the image reading device 14. Then, the user performs a read instruction with respect to the image reading device 14.

Figure 4:
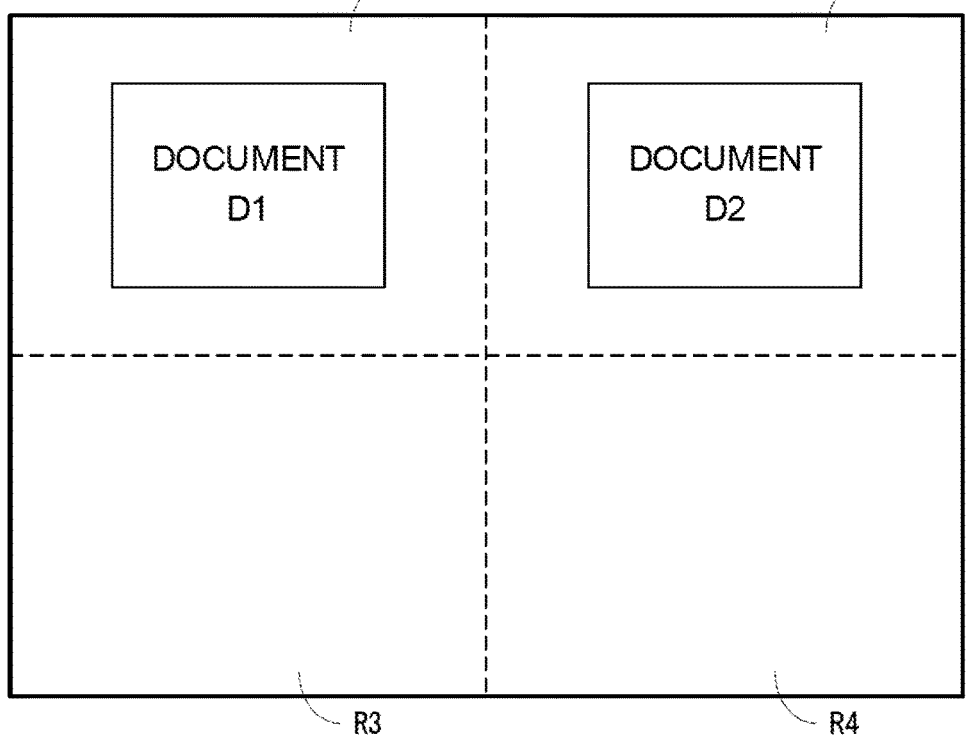
FIG. 4 is a diagram showing an example of a state where documents have been placed in the read area.

FIG. 4 shows an example of a state where documents have been placed in the read area 200. In the example shown in FIG. 4, among the divided areas R1 to R4, documents are respectively disposed (placed) inside the area of the divided area R1 and inside the area of the divided area R2. In this state, the user performs a read instruction by operating the start button of the operation panel. The start button is a software key provided on the operation panel. Note that this is merely an example, and the start button may also be a hardware key provided on the operation panel or on the device body 12.

In response to the read instruction by the user, the image reading device 14 executes reading of the documents, and reads an image that corresponds to the whole read area 200 which includes images of the documents placed on the document placement table 16 (hereinafter, referred to as a "whole image"), and generates data relating to the whole image that has been read (hereinafter, referred to as "whole image data"). Furthermore, an image for edge detection having adjusted gradation characteristics is generated based on the whole image data.

The edges of each document are recognized based on the image for edge detection. Then, data relating to individual images that each independently correspond to the documents (hereinafter, referred to as "individual image data") is sequentially cut out (extracted) from the whole image data according to the edges of each document. The method of generating individual image data from the whole image data by analyzing the whole image data can be realized by using the known technique described above. Furthermore, if the pixels of the whole image and the pixels of the image for edge detection are managed using the same coordinate system as the coordinate system of the read area 200 of the document placement table 16, the correspondence between the individual image data and the documents placed in the divided areas R1 to R4 can be easily known.

Further, the individual image data is associated with a divided area in which the corresponding document is placed. Specifically, identifying information relating to the divided area in which the corresponding document is placed is added to the individual image data. In the example shown in FIG. 4, the individual image data corresponding to the document D1 placed in the divided area R1 has identifying information relating to the divided area R1 added to it. The individual image data corresponding to the document D2 placed in the divided area R2 has identifying information relating to the divided area R2 added to it.

Furthermore, when the individual image data is generated, image file data that includes the individual image data is generated for each divided area. Moreover, the generated image file has a file name automatically added to it, and is stored in the HDD 86.

In this manner, by using the multicrop scanning function, a plurality of document images is acquired with a single scan. Further, for each divided area R1 to R4, it is possible to generate image files including individual image data corresponding to the documents placed in each area.

Note that, as described above, the boundaries that divide the divided areas R1 to R4 are not actually displayed. Therefore, the user may sometimes place a document in a position which is not appropriate. That is to say, a document may sometimes be placed in a position which is not appropriate. Here, cases where a document is placed in a position which is not appropriate include a case where a document is placed straddling a plurality of divided areas, and a case where a plurality of documents are placed in a single divided area. If document reading is executed in a state where a document is placed in a position which is not appropriate, the operation described above cannot be performed. That is to say, a read error occurs. Hereinafter, the operation of the image reading device 14 (image forming device 10) in a case where a document is placed in a position which is not appropriate will be described with reference to FIG. 5 to FIG. 9.

Figure 5:
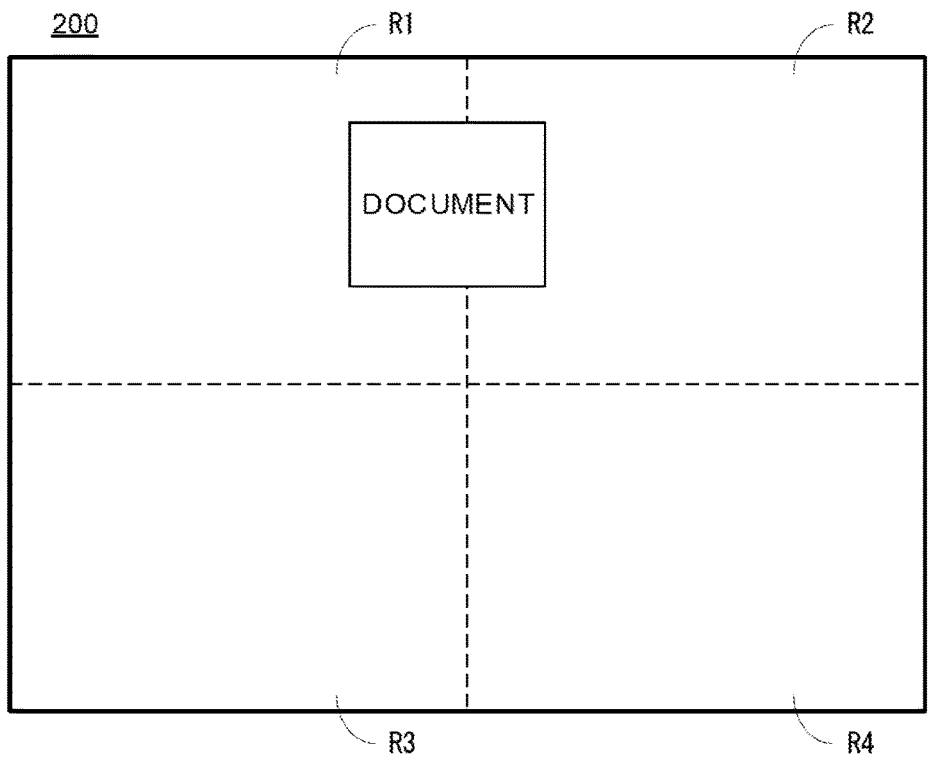
FIG. 5 is a diagram showing an example of a state where a document has been placed straddling a plurality of divided areas.
Figure 6:
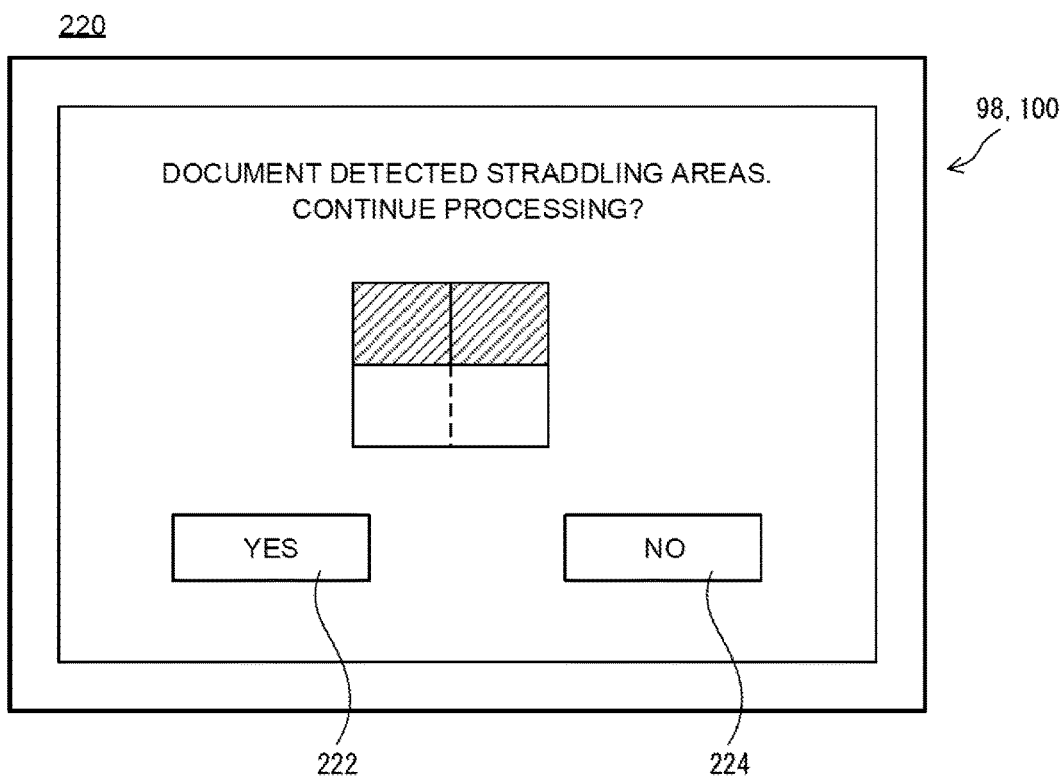
FIG. 6 is an illustrative view showing an example of a first notification screen.
Figure 7:
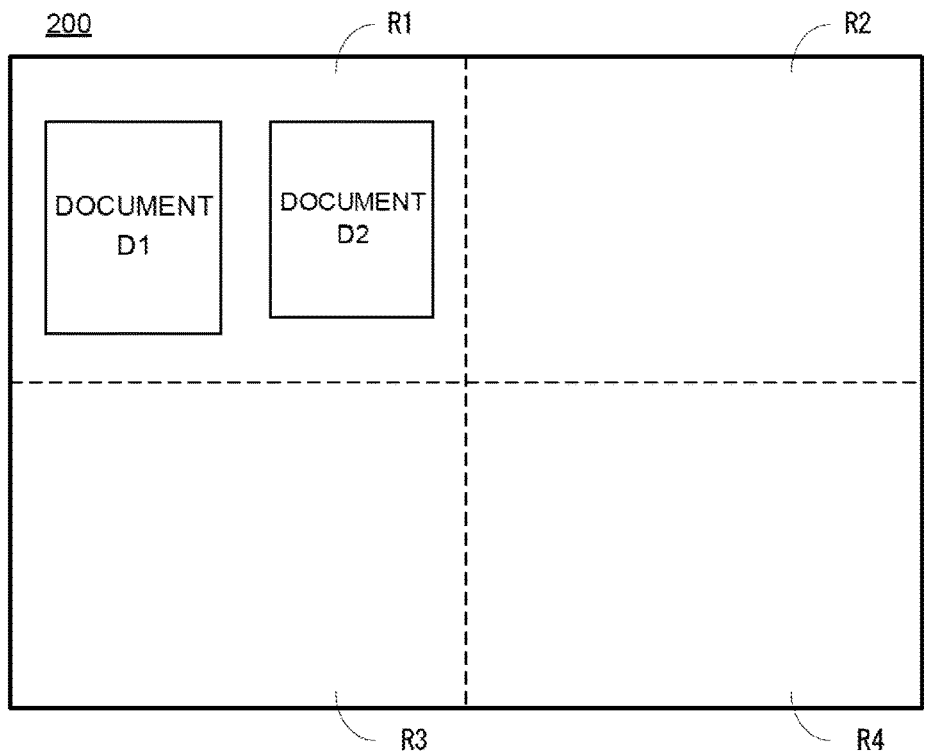
FIG. 7 is a diagram showing an example of a state where a plurality of documents has been placed in a certain divided area.
Figure 8:
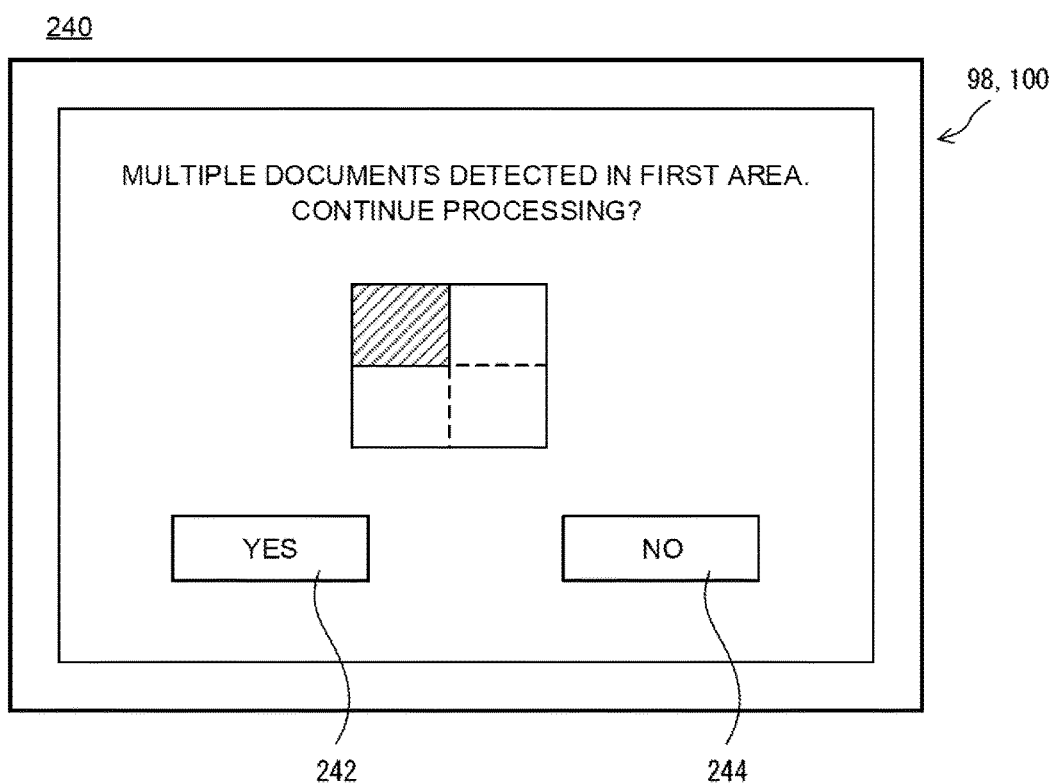
FIG. 8 is an illustrative view showing an example of a second notification screen.
Figure 9:
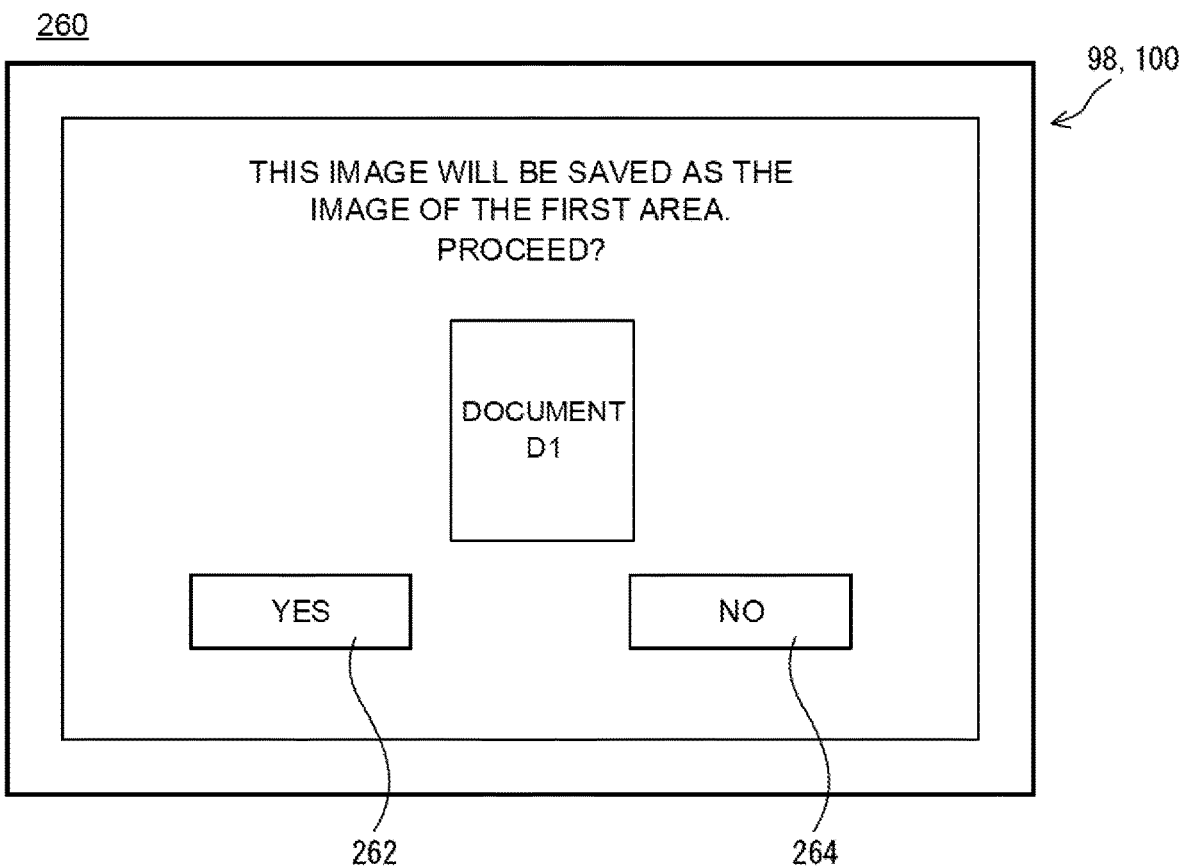
FIG. 9 is an illustrative view showing an example of a selection screen.

FIG. 5 is a diagram showing an example of a state where a document has been placed straddling a plurality of divided areas. FIG. 6 is an illustrative view showing an example of a first notification screen 220. FIG. 7 is a diagram showing an example of a state where a plurality of documents has been placed in a single divided area. FIG. 8 is an illustrative view showing an example of a second notification screen 240. FIG. 9 is an illustrative view showing an example of a selection screen 260.

For example, a document is sometimes placed straddling a plurality of divided areas as shown in FIG. 5. In the example shown in FIG. 5, a document is placed straddling the divided area R1 and the divided area R2. If document reading is executed in this state, it is detected that a document is placed straddling a plurality of divided areas (hereinafter, sometimes referred to as "area straddling error"). Note that the existence of an area straddling error is determined according to each of the divided areas R1 to R4 and the position of the individual image (the pixel positions of the edges of the individual image). Furthermore, if it is determined that an area straddling error exists, the divided areas that the document is straddling are also detected.

When an area straddling error occurs in the first embodiment, the user is notified that an area straddling error has occurred, that is to say, that the document has not been appropriately placed. Alternatively, instead of issuing a notification, the individual image corresponding to the document may be automatically associated with one of the divided areas among the plurality of divided areas in which the document is straddling. When an area straddling error occurs, whether a notification indicating that an area straddling error has occurred is issued, or the document is automatically associated with one of the divided areas among the plurality of divided areas is set in advance. This setting can be changed according to the usage status of the image reading device 14 (image forming device 10) and the like.

First, a case where a notification is issued indicating that an area straddling error has occurred will be described. As shown in FIG. 6, if a notification is issued indicating that an area straddling error has occurred, a first notification screen 220 for notifying that a document has been placed straddling plurality of divided areas is displayed on the display 100.

The first notification screen 220 is provided with (displays) a message indicating that a document has been placed straddling a plurality of divided areas, a message for selecting whether or not scanning (that is to say, generation of an image file) is to be continued, a diagram indicating the divided areas in which the area straddling error has occurred, a first key 222, and a second key 224.

The first key 222 is assigned a function that continues a scan, that is to say, a function that generates an image file. The same applies to the first keys 242, 262, 282, 322, and 342 described below.

The second key 224 is assigned a function that cancels a scan, that is to say, a function that repeats a scan. The same applies to the second keys 244, 264, 284, 324, and 344 described below.

The first notification screen 220 prevents operations other than touch operations with respect to the first key 222 or the second key 224, and other operations are not possible. The same applies to the second notification screen 240, the selection screen 260, the third notification screen 280, the fourth notification screen 320, and the fifth notification screen 340.

When the first key 222 is touched, identifying information relating to one of the divided areas among the plurality of divided areas that the document is straddling is added according to the position of the individual image causing the area straddling error. That is to say, one of the divided areas among the plurality of divided areas and the individual image data are associated with each other. Specifically, the area of the section in which the individual image causing the area straddling error overlaps with each divided area (overlapping area) is calculated. Then, the divided area having the largest overlapping area with the individual image and the individual image data relating to the individual image are associated with each other. Furthermore, the distance between the central position of the individual image causing the area straddling error and the central position of each divided area may be calculated, and the divided area which is closest to the position of the individual image (document position) and the individual image data may be associated with each other. Instead of issuing a notification, if the document is automatically associated with one of the divided areas among the plurality of divided areas, the processing performed when the first key 222 is touched is automatically executed without displaying the first notification screen 220.

On the other hand, when the second key 224 is touched, scanning is cancelled and the process returns to the state prior to performing the read instruction. Therefore, the user is capable of moving the document to an appropriate position, that is to say, inside the area of one of the divided areas, and then performing the read instruction again.

Next, as shown in FIG. 7, a plurality of documents is sometimes placed in a single divided area. In the example shown in FIG. 7, two documents (the document D1 the document D2) are placed in the divided area R1. If document reading is executed in this state, it is detected that two documents are placed in the divided area R1, that is to say, that there is a divided area in which a plurality of documents are placed (hereinafter, sometimes referred to as a "document number error"). Note that the existence of a document number error is determined according to each of the divided areas R1 to R4 and the positions of the individual images.

When a document number error occurs in the first embodiment, the user is notified that the document number error has occurred, that is to say, that the documents have not been appropriately placed. Specifically, as shown in FIG. 8, a second notification screen 240 for notifying that there is a divided area in which a plurality of documents are placed is displayed on the display 100.

The second notification screen 240 is provided with a message indicating that there is a divided area in which a plurality document are placed, a message for selecting whether or not scanning is to be continued, a diagram indicating the divided area in which the document number error has occurred, a first key 242, and a second key 244.

When the first key 242 is touched, one of the individual images among the plurality of images included in the divided area in which the document number error has occurred is set as a candidate to be associated with the divided area (association candidate). For example, the areas of the sections in which each of the plurality of individual images overlap with the divided area (overlapping area) are calculated. Then, the individual image having the largest overlapping area among the plurality of individual images is set as the association candidate.

When an association candidate is set, the individual image which has been set as the association candidate is presented to the user. The user is capable of selecting whether the individual image is saved, that is to say, whether an image file is generated, or read processing is repeated. Specifically, as shown in FIG. 9, a selection screen 260 which includes a preview image of the individual image which has been set as the association candidate is displayed on the display 100.

The selection screen 260 is provided with the preview image of the individual image which has been set as the association candidate, a message that causes the user to select whether or not the individual image is saved as the image of the corresponding divided area, a first key 262, and a second key 264. In the example shown in FIG. 9, the individual image corresponding to the document D1 is set as the association candidate.

When the first key 262 is touched, image file data including the individual image data of the individual image set as the association candidate is generated. Note that identifying information relating to the divided area in which the document corresponding to the individual image is placed is added to the individual image data.

On the other hand, when the second key 244 on the second notification screen 240 is touched, or the second key 264 on the selection screen 260 is touched, scanning is cancelled and the process returns to the state prior to performing the read instruction. When the second key 264 is touched on the selection screen 260, an individual image other than the individual image which has been set as the association candidate may be newly set as the association candidate, and after presentation to the user again, the user is capable of selecting whether or not the individual image is to be saved. Although not shown, in this case a selection screen identical to the selection screen 260 for presenting the individual image which has been newly set as the association candidate to the user is displayed on the display 100.

The operation of the image forming device 10 described above is realized as a result of the CPU 80 executing control programs stored in the RAM 84. The specific processing is described below using flow diagrams.

Figure 10:
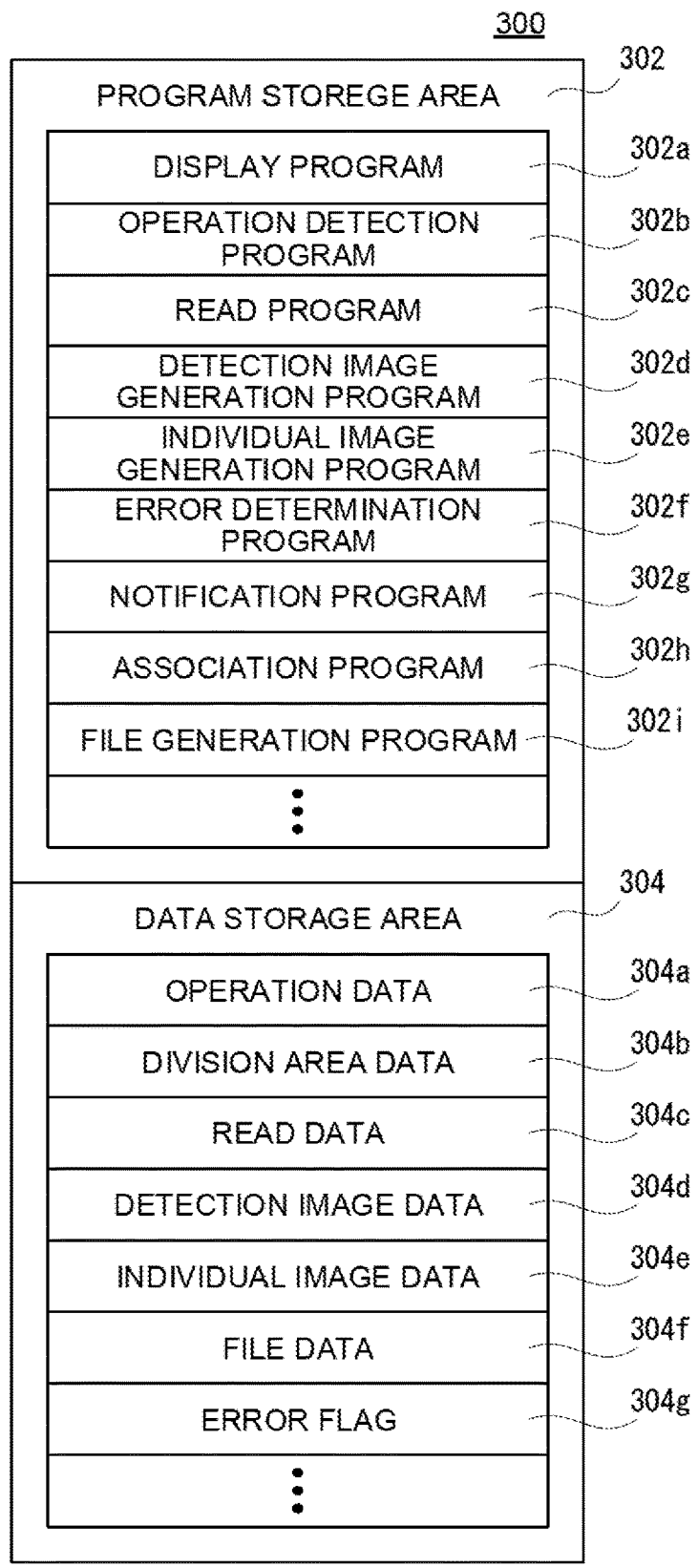
FIG. 10 is a diagram showing an example of a memory map of the random access memory (RAM) shown in FIG. 2.

FIG. 10 is a diagram showing an example of a memory map 300 of the RAM 84 shown in FIG. 2. The RAM 84 includes a program storage area 302 and a data storage area 304. The program storage area 302 stores the control programs of the image forming device 10. Note that, because the image forming device 10 includes the image reading device 14, these control programs include the control programs of the image reading device 14.

As shown in FIG. 10, the control programs stored in the program storage area 302 including a display program 302a, an operation detection program 302b, a read program 302c, a detection image generation program 302d, an individual image generation program 302e, an error determination program 302f, a notification program 302g, an association program 302h, and a file generation program 302i.

The display program 302a is a program for using image generation data including polygon data and texture data to generate display image data corresponding to various screens displayed on the display 100, such as the first notification screen 220, the second notification screen 240, and the selection screen 260, and for outputting the screens to the display 100.

The operation detection program 302b is a program for detecting user operation inputs with respect to the touch panel 98 and the operation buttons 102. It detects touch coordinate data input as a result of operating the touch panel 98, detects operation data or operation signals as a result of operating the operation buttons 102, and temporarily stores the data in the data storage area 304.

The read program 302c is a program for reading (scanning) a document image, and outputting an image signal (image data) corresponding to the read image. As described above, when the multicrop mode is set, the read program 302c scans an image of the whole read area 200, which includes images of the plurality of documents placed on the document placement table 16, and outputs whole image data relating to the whole image.

The detection image generation program 302d is a program for generating, based on the whole image, an image for edge detection having adjusted gradation characteristics such that differences in density are emphasized.

The individual image generation program 302e is a program for recognizing the boundaries of each document based on an image for edge detection, individually cutting out each of the plurality of document images, and generating individual image data corresponding to the individual images that have been individually cut out. As described above, according to the first embodiment, individual image data is generated for each of the divided areas R1 to R4. Note that if the documents are placed in appropriate positions, individual image data is generated for those divided areas in which the documents corresponding to the individual images are placed. On the other hand, if the documents are placed in positions which are not appropriate, individual image data is generated in response to a user instruction, or automatically, for those divided areas in which the individual images are associated according to the association program 302h.

The error determination program 302f is a program for determining, according to the positions of the divided areas R1 to R4 and of the individual images, whether or not a document has been placed in a position which is not appropriate, that is to say, whether or not a read error exists, such as an area straddling error or a document number error. Furthermore, if it is determined according to the error determination program 302f that a read error exists, an error flag 304g described below is updated according to the determination result.

The notification program 302g is a program for outputting, when a read error exists, a notification screen to the display 100 that notifies the user of the error.

The association program 302h is a program for associating, when the documents are placed in appropriate positions, the individual image data with the divided areas in which the corresponding documents are placed. Furthermore, the association program 302h is a program for associating, when a read error exists, that is to say, when the documents are placed in positions which are not appropriate, the divided areas and the individual image data according to the divided areas and the positions of the individual images.

The file generation program 302i is a program for generating image files which include the individual image data for the divided areas R1 to R4.

Although not shown, the program storage area 302 also stores other programs, such as a communication program and an image forming program, for controlling the functions provided in the image forming device 10.

Furthermore, the data storage area 304 stores operation data 304a, divided area data 304b, read data 304c, detection image data 304d, individual image data 304e, and file data 304f.

The operation data 304a is touch coordinate data input from the touch panel 98 and/or operation data input from the operation buttons 102 detected according to the operation detection program 302b. The divided area data 304b is coordinate data for defining the area of each of the divided areas R1 to R4 in the read area 200, and represents, for example, the coordinate data of two vertices at opposite corners for each divided area R1 to R4.

The read data 304c is image data which has been output according to the read program 302c. In the multicrop mode, the whole image data is stored as read data 304c. The detection image data 304d is image data relating to images for edge detection generated according to the detection image generation program 302d. The individual image data 304e is individual image data relating to the divided areas R1 to R4 generated according to the individual image generation program 302e.

The file data 304f is data relating to the image files of each divided area R1 to R4, which includes individual image data, generated according to the file generation program 302i.

Furthermore, the data storage area 304 stores an error flag 304g. The error flag 304g is flag data for determining whether or not a read error exists. According to the first embodiment, the error flag 304g is constituted by a two-bit register where, in order from the most significant bit, the bits sequentially correspond to an area straddling error and a document number error. The register corresponding to an area straddling error is set to 0 when there is no area straddling error, and is set to 1 when there is an area straddling error. Furthermore, the register corresponding to a document number error is set to 0 when there is no document number error, and is set to 1 when there is a document number error.

Although not shown, the data storage area 304 stores other data, such as image generation data, necessary for executing the control programs, and stores other flags necessary for executing the control programs.

Figure 11:
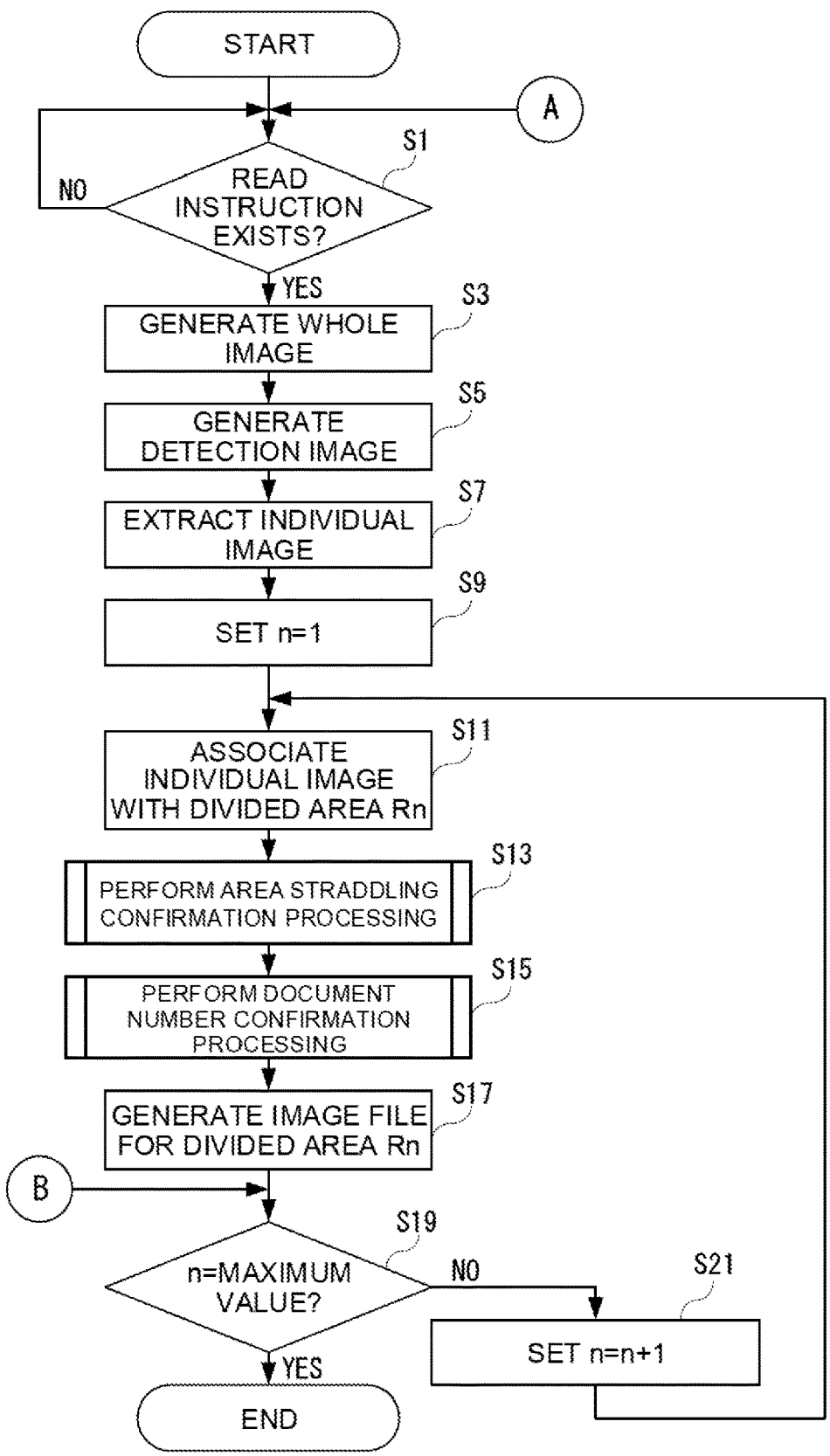
FIG. 11 is a flow diagram showing an example of read processing performed by the central processing unit (CPU) shown in FIG. 2.

FIG. 11 is a flow diagram showing an example of the read processing performed by the CPU 80 shown in FIG. 2. As shown in FIG. 11, when the user sets the multicrop mode, the CPU 80 starts the read processing and determines in step S1 whether or not a read instruction exists. Here, the CPU 80 determines whether or not the start button has been operated. The user places documents on the document placement table 16 before performing the read instruction. Furthermore, the divided area data 304b is stored in the data storage area 304 prior to starting the read processing.

If the result of step S1 is "NO", that is to say, if there is no read instruction, the process returns to step S1. On the other hand, if the result of step S1 is "YES", that is to say, a read instruction exists, reading of the documents is executed in step S3 such that a whole image that contains images of the documents placed on the document placement table 16 is generated.

Next, in step S5, an image for edge detection is generated based on the whole image. In step S7, the edges of each document are recognized from the image for edge detection, and individual images corresponding to each document are extracted from the whole image according to the edges of each document. In the following step S9, a variable n is set to an initial value (n=1). The variable n is a variable for individually identifying the divided areas R1 to R4. When the variable n is 1, it refers to the divided area R1. When the variable n is 2, it refers to the divided area R2. When the variable n is 3, it refers to the divided area R3. Further, when the variable n is 4, it refers to the divided area R4. The same applies hereinafter.

Next, in step S11, the individual image included in the divided area Rn is associated with the divided area Rn. Here, the individual image causing an area straddling error and the plurality of individual images causing a document number error are also associated with the divided area Rn if a portion of the images are included in the divided area Rn.

Next, in step S13, area straddling confirmation processing is performed with respect to the divided area Rn. Then, in step S15, document number confirmation processing is performed with respect to the divided area Rn. In step S17, an image file including the individual image associated with the divided area Rn is generated.

In the following step S19, it is determined whether or not the variable n is the maximum value (4 in the first embodiment). That is to say, it is determined whether or not area straddling confirmation processing, document number confirmation processing, and image file generation has been completed with respect to all of the divided areas Rn. If the result of step S19 is "NO", that is to say, if the variable n is not the maximum value, in step S21 the variable n is incremented by 1 (n=n+1), the process returns to step S11. That is to say, area straddling confirmation processing, document number confirmation processing, and image file generation is executed with respect to the next divided area Rn. On the other hand, if the result of step S19 is "YES", that is to say, the variable n is the maximum value, the read processing ends.

Figure 12:
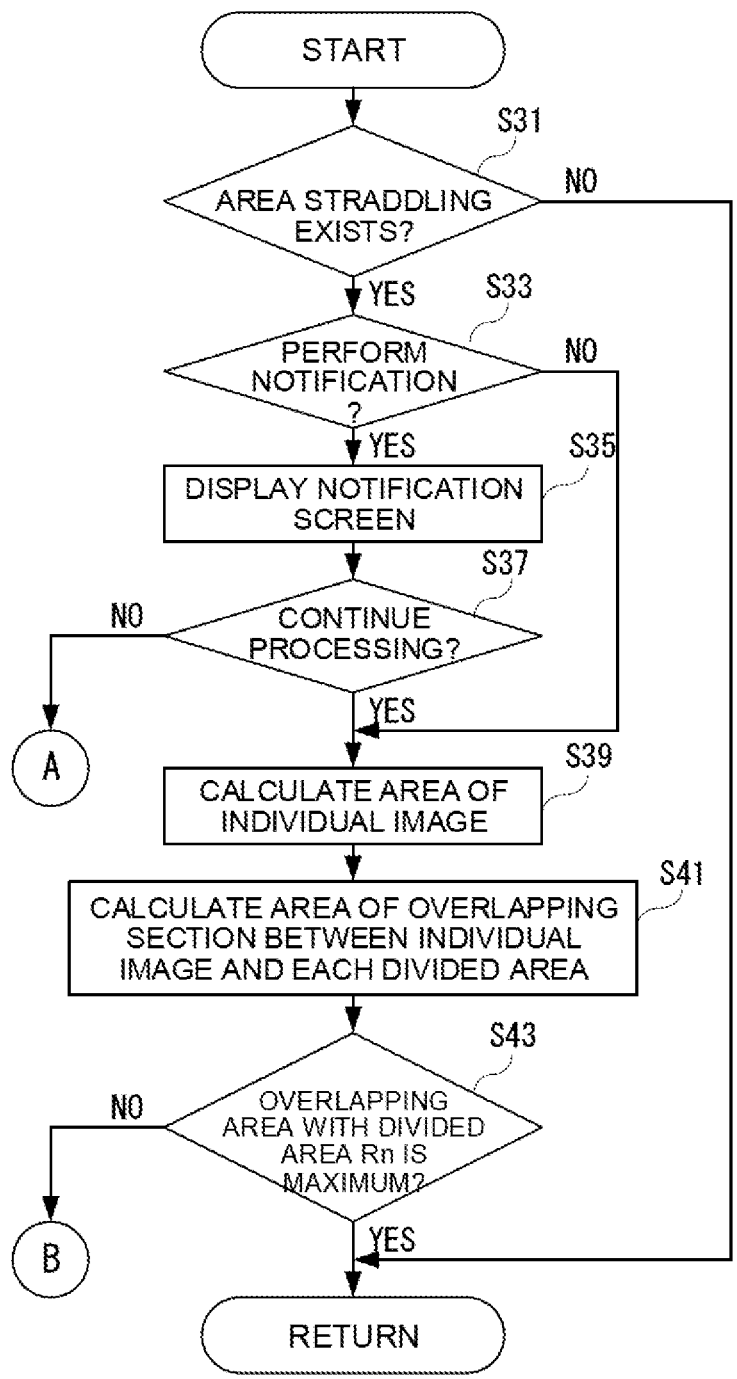
FIG. 12 is a flow diagram showing an example of area straddling confirmation processing performed by the CPU shown in FIG. 2.

FIG. 12 is a flow diagram showing an example of area straddling confirmation processing performed by the CPU 80 shown in FIG. 2. For example, the flow of the area straddling confirmation processing is a subroutine executed in step S13 of the read processing described above.

As shown in FIG. 12, when the CPU 80 starts the area straddling confirmation processing, it determines in step S31 whether an area straddling error exists in the divided area Rn. Here, the existence of an area straddling error is determined according to the divided area Rn and the position of the extracted individual image.

If the result of step S31 is "NO", that is to say, if it determined that there is no area straddling error, the flow of the area straddling confirmation processing ends, and the process returns to the overall information processing, and therefore, the read processing. On the other hand, if the result of step S31 is "YES", that is to say, if it is determined that an area straddling error exists, it is determined in step S33 whether or not the area straddling error is to be notified.

If the result of step S33 is "NO", that is to say, if the area straddling error is not to be notified, the process proceeds to step S39 described below. On the other hand, if the result of step S33 is "YES", that is to say, if the area straddling error is to be notified, in step S35 a notification screen for notifying the user that an area straddling error exists (for example, the first notification screen 220) is displayed on the display 100. Then, in step S37, it is determined whether or not the read processing is to be continued. Here, it is determined whether or not a key that instructs the read processing to be continued has been touched on the notification screen. For example, it is determined whether or not the first key 222 on the first notification screen 220 has been touched.

If the result of step S37 is "NO", that is to say, if it is determined that the read processing is not to be continued, the flow of the area straddling confirmation processing ends, and the process returns to step S1 of the read processing. On the other hand, if the result of step S37 is "YES", that is to say, if it is determined that read processing is to be continued, in step S39 the area of the individual image causing the area straddling error is calculated. Then, in step S41, the respective overlapping areas between the individual image and each divided area are calculated. In step S43, it is determined whether or not the overlapping area between the individual image and the divided area Rn is the maximum area. Here, it is determined whether or not the overlapping area between the individual image and the divided area Rn is larger than the overlapping area between the individual image and the other divided areas.

If the result of step S43 is "NO", that is to say, if it is determined that the overlapping area between the individual image and the divided area Rn is not the maximum area, then the flow of the area straddling confirmation processing ends, and the processing returns to step S19 of the read processing. On the other hand, if the result of step S43 is "YES", that is to say, if it is determined that the overlapping area between the individual image and the divided area Rn is the maximum area, then the flow of the area straddling confirmation processing ends, and the processing returns to the read processing.

Figure 13:
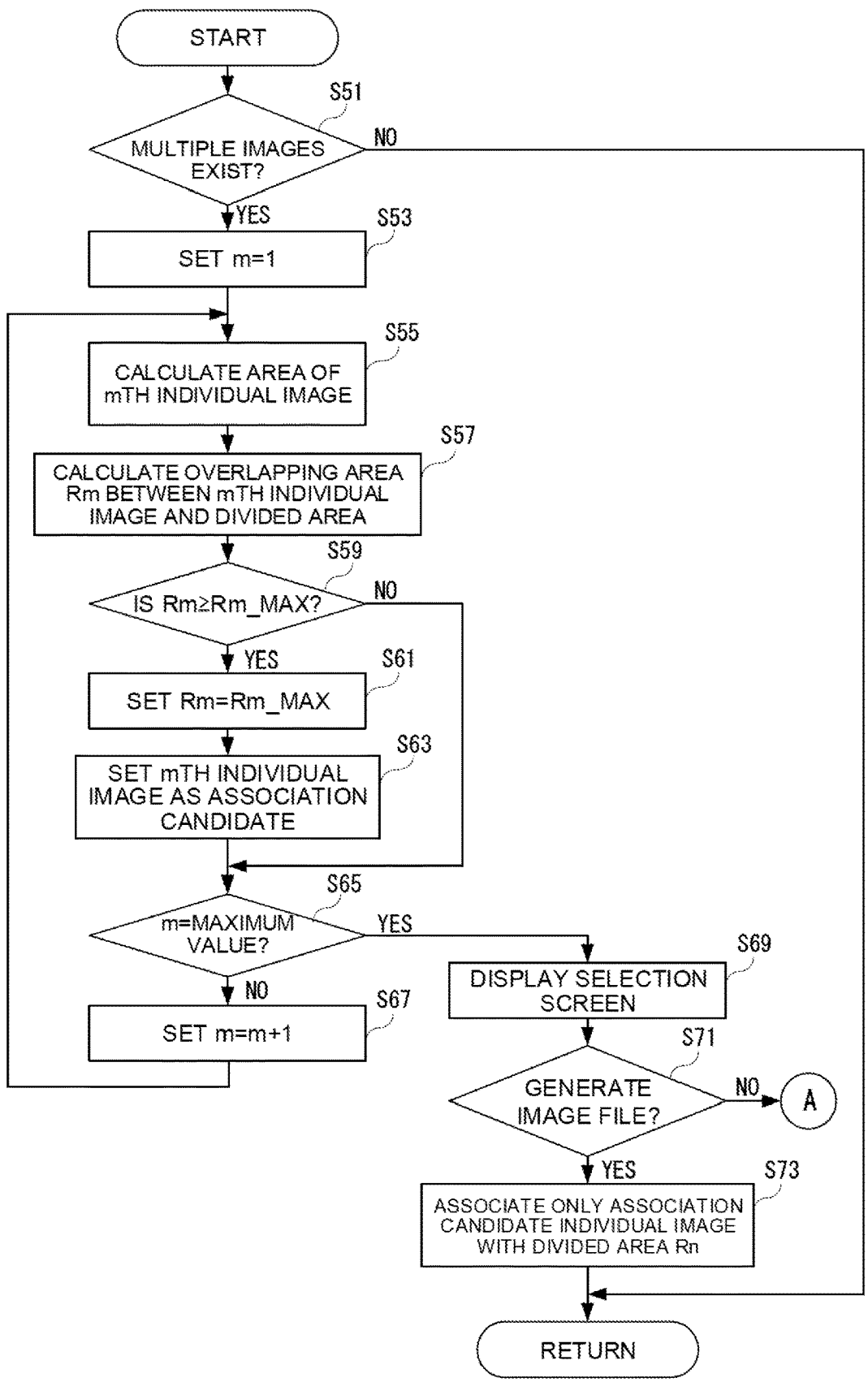
FIG. 13 is a flow diagram showing an example of document number confirmation processing performed by the CPU shown in FIG. 2.

FIG. 13 is a flow diagram showing an example of document number confirmation processing performed by the CPU 80 shown in FIG. 2. For example, the flow of the document number confirmation processing is a subroutine executed in step S15 of the read processing described above.

As shown in FIG. 13, when the CPU 80 starts the document number confirmation processing, it determines in step S51 whether or not a document number error exists. That is to say, it is determined whether or not a plurality of individual images (documents) exists inside the divided area Rn.

If the result of step S51 is "NO", that is to say, if it determined that there is no document number error, the flow of the document number confirmation processing ends, and the process returns to the read processing. On the other hand, if the result of step S51 is "YES", that is to say, if it is determined that a document number error exists, in step S53 a variable m is set to an initial value (m=1). The variable m is a variable for individually identifying the plurality of individual images included in the divided area Rn. If the variable m is 1, it refers to the first individual image. If the variable m is 2, it refers to the second individual image. The same applies hereinafter.

Next, in step S55, the area of the mth individual image is calculated. Then, in step S57, an overlapping area Rm between the mth individual image and the divided area Rn is calculated. In step S59, it is determined whether the overlapping area Rm is larger than a variable Rm_MAX. Note that the variable Rm_MAX is a variable representing the maximum value among the values of the overlapping areas between each of the plurality of individual images included in the divided area Rn and the divided area. It is set to an initial value (Rm_MAX=0) when the flow of the document number confirmation processing is started.

If the result of step S59 is "NO", that is to say, if it is determined that the overlapping area Rm is less than or equal to the variable Rm_MAX, the process proceeds to step S65 described below. On the other hand, if the result of step S59 is "YES", that is to say, if it is determined that the overlapping area Rm is larger than the variable Rm_MAX, in step S61 the overlapping area Rm is substituted into the variable Rm_MAX. Then, in step S63, the mth individual image is set as the association candidate for the divided area Rn. In step S65, it is determined whether or not the variable m is the maximum value. That is to say, it is determined whether or not the processing of steps S55 to S63 have been completed for all of the individual images included in the divided area Rn.

If the result of step S65 is "NO", that is to say, if the variable m is not the maximum value, in step 67 the variable m is incremented by 1 (m=m+1), the process returns to step S55. On the other hand, if the result of step S65 is "YES", that is to say, if the variable m is the maximum value, in step S69 the individual image set as the association candidate for the divided area Rn is presented to the user, and a selection screen for the user to select whether or not an image file is to be generated (for example, the selection screen 260) is displayed on the display 100. Then, in step S71, it is determined whether or not an image file is to be generated. Here, it is determined whether or not a key that instructs the image file to be generated has been touched on the selection screen. For example, it is determined whether or not the first key 262 on the selection screen 260 has been touched. If the result of step S71 is "NO", that is to say, if it is determined that the image file is not to be generated, the flow of the document number confirmation processing ends, and the process returns to step S1 of the read processing. On the other hand, if the result of step S71 is "YES", that is to say, if it is determined that the image file is to be generated, in step S73 only the individual image set as the association candidate for the divided area Rn is associated with the divided area Rn. Then, the flow of the document number confirmation processing ends, and the processing returns to the read processing.

According to the first embodiment, if document reading is executed in a state where the documents are placed in positions which are not appropriate, the user is notified that the documents are not appropriately placed before the image file data is generated. Therefore, user burden can be reduced when a read error occurs.

Furthermore, according to the first embodiment, the user is notified when a document has been placed straddling a plurality of divided areas. Therefore, user burden can be reduced.

In addition, according to the first embodiment, when a document is placed straddling a plurality of divided areas, the individual image corresponding to the document is automatically associated with one of the divided areas among the plurality of divided area in which the document is straddling according to a user instruction, or automatically. Therefore, user burden can be reduced.

Further, according to the first embodiment, the user is notified when a plurality of documents has been placed in a single divided area. Therefore, user burden can be reduced.

Moreover, according to the first embodiment, when a plurality of documents are placed in a single divided area, one of the individual images among the plurality of individual images is set as an association candidate to be associated with the divided area, and the individual image set as the association candidate and the divided area are associated according to a user instruction. Therefore, user burden can be reduced.

Second Embodiment

The image reading device 14 according to the second embodiment is identical to that of the first embodiment, except in the aspect that, in a case where a plurality of times of read processing is executed, the user is notified when there is a change in document characteristics in each time of the read processing in each divided area. Therefore, only the content that differs will be described, and duplicate descriptions are omitted.

First, according to the second embodiment, the image reading device 14 executes the first time of read processing according to a first read instruction from the user, a first whole image is read, and data relating to the whole image that has been read (first whole image data) is generated. Then, an image for edge detection is generated based on the first whole image data. Individual images are sequentially cut out according to the image for edge detection. Image file data including the data relating to the individual images (first individual image data) is generated for each divided area.

When the image file data for each divided area is generated, that is to say, when the first time of read processing is completed, a message prompting for documents to be placed for the second time of read processing, and a message prompting the user for a second read instruction are displayed on the display 100 of the image forming device 10. At this time, the display 100 displays a software key (end key) assigned a function that ends document reading. The user is capable of ending read processing by touching the end key.

Then, the image reading device 14 executes the second time of read processing according to the second read instruction from the user. As a result, a second whole image is read, and data relating to the whole image that has been read (second whole image data) is generated. Further, an image for edge detection is generated based on the second whole image data. Individual images are sequentially cut out according to the image for edge detection. Data relating to the individual images (second individual image data) is generated for each divided area. Note that the second individual image data is collected into image files that contain the first individual image data for the same divided area. That is to say, the image file data is updated. If third and subsequent times of read processing are executed, the same processing as the second time of read processing is performed. The individual image data generated in each time of the read processing is added to the image file data for the divided area corresponding to the individual image data.

Note that the user may sometimes place documents incorrectly, such as when the user places a document which is different from the intended document in each time of the read processing, or when the user places a document in a divided area which is different from the intended divided area in each time of the read processing. Here, when documents are incorrectly placed, the size of the document placed in a certain divided area in each time of the read processing becomes different, or the number of documents placed in a certain divided area in each time of the read processing becomes different. Therefore, when documents are incorrectly placed, there is a change in document characteristics in each time of the read processing in each divided area. In this manner, when there is a change in document characteristics in each time of the read processing in each divided area, a read error as described in the first embodiment does not occur. However, the image file data intended by the user is sometimes not generated.

Figure 14:
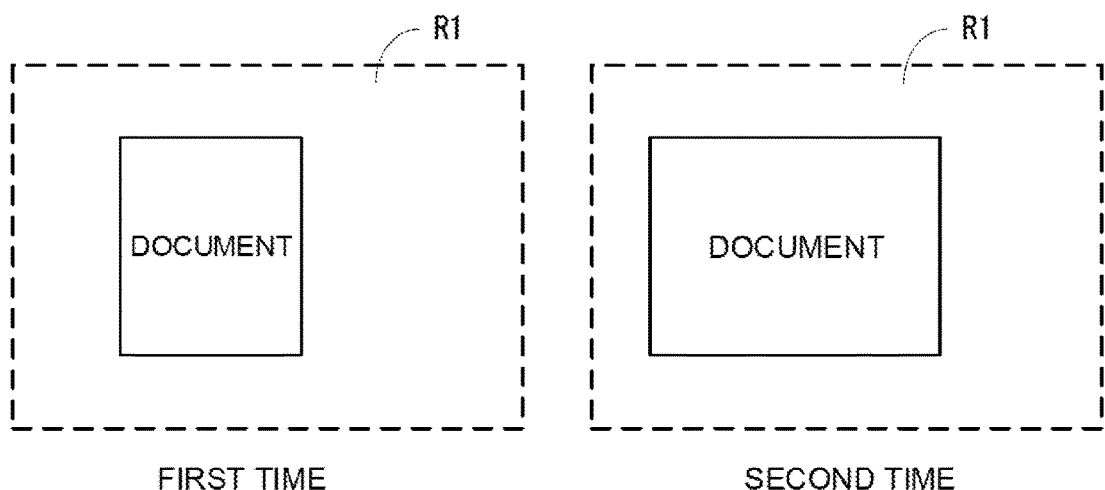
FIG. 14 is a diagram showing an example of a state where documents having different sizes are placed in the same divided area in the first time and the second time.
Figure 15:
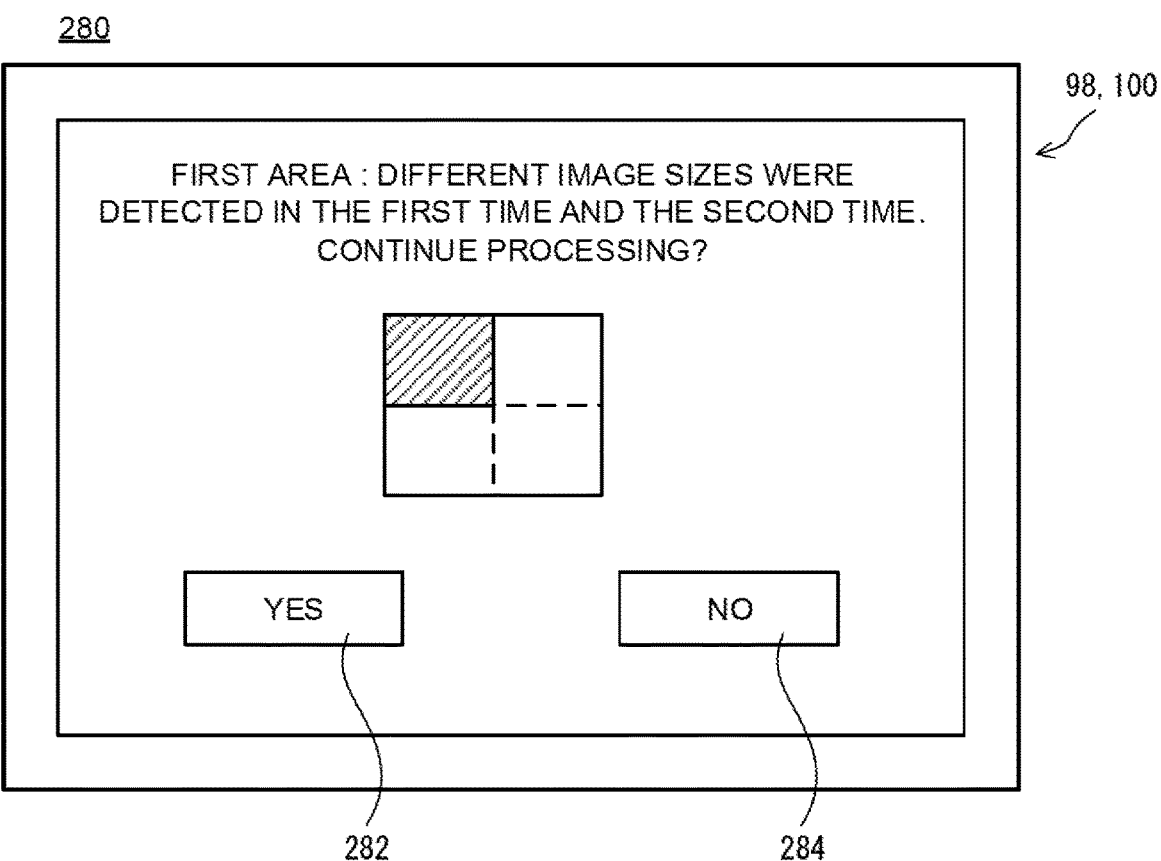
FIG. 15 is an illustrative view showing an example of a third notification screen.
Figure 16:
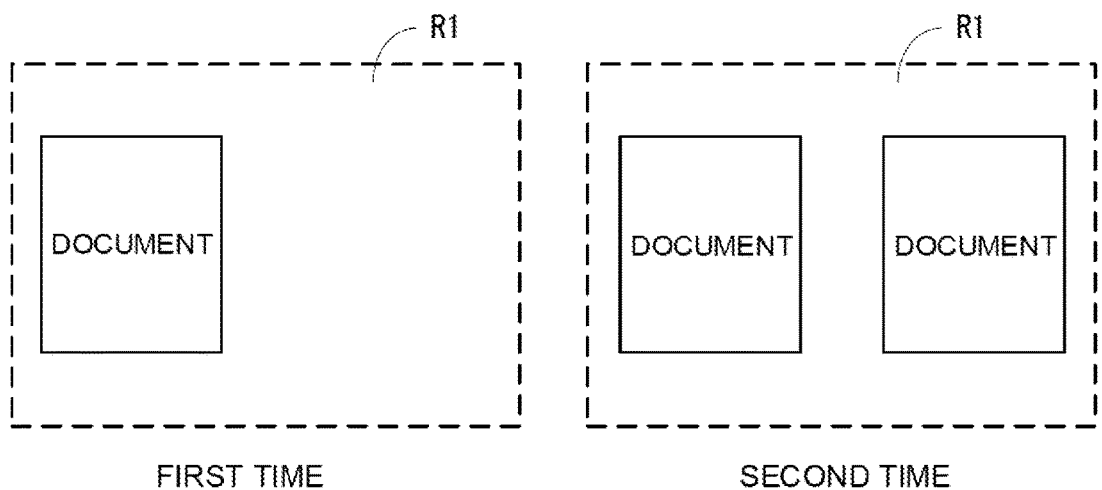
FIG. 16 is a diagram showing an example of a state a different number of documents are placed in the same divided area in the first time and the second time.
Figure 17:
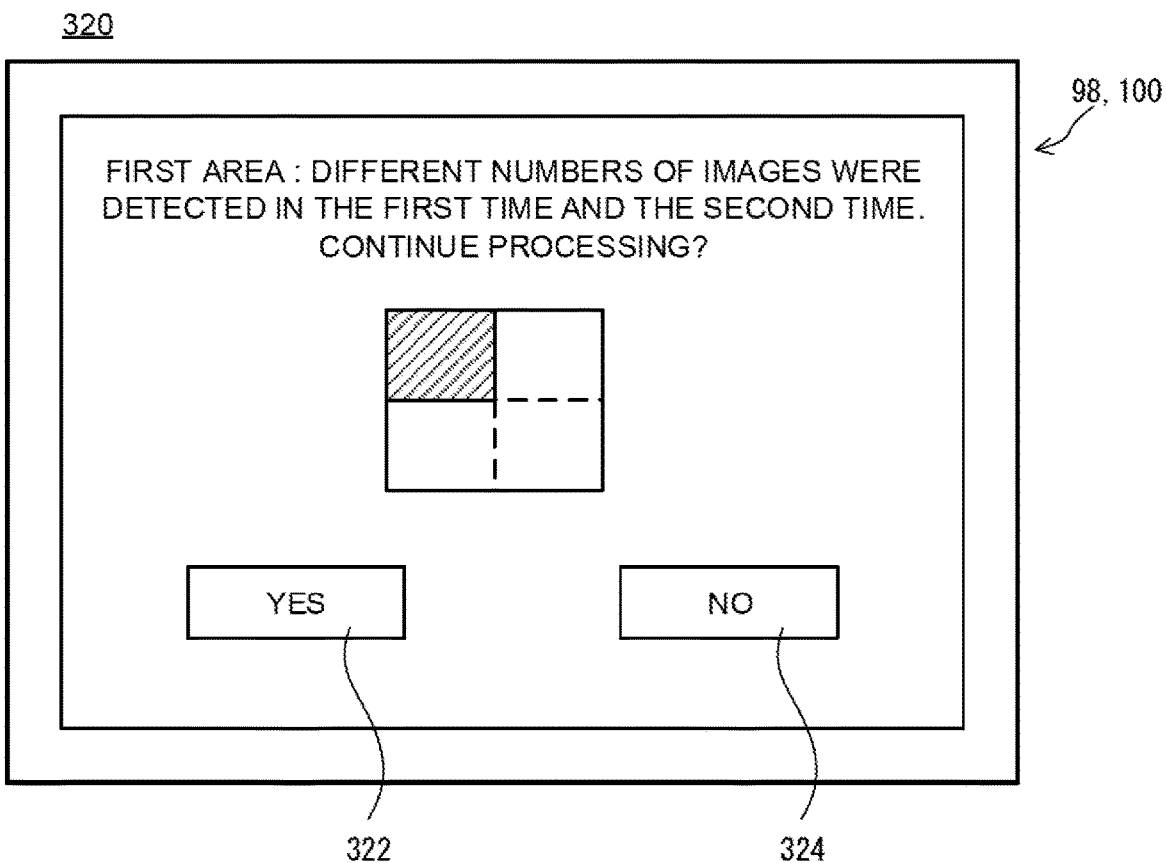
FIG. 17 is an illustrative view showing an example of a fourth notification screen.
Figure 18:
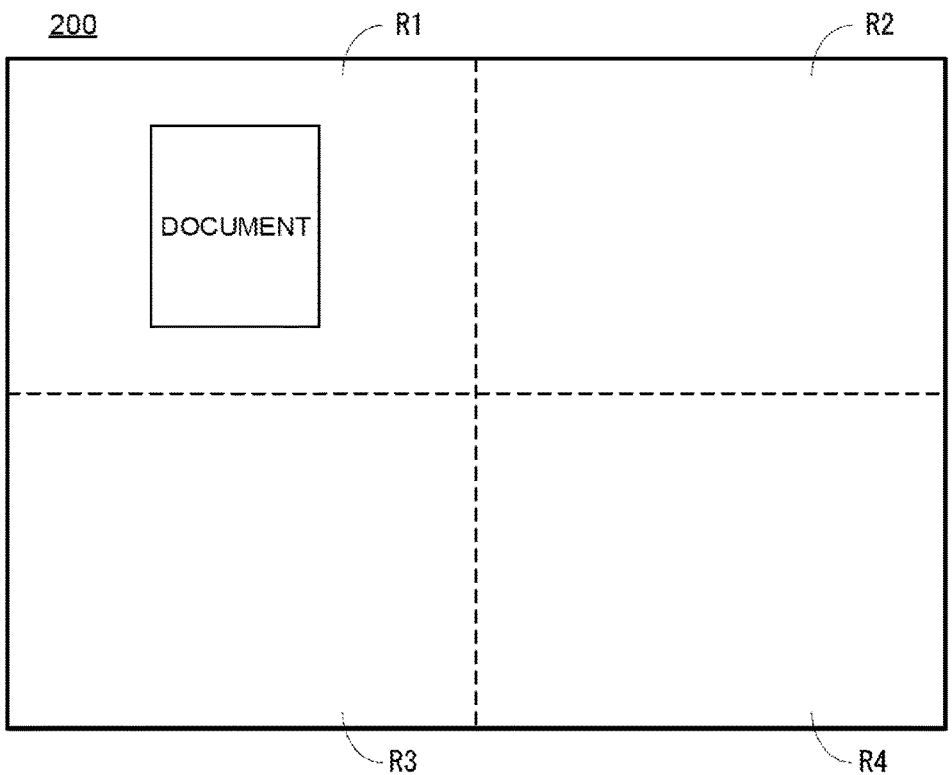
FIG. 18 is a diagram showing an example of a state where the same document is placed in a different divided area in the first time and the second time.
Figure 18:
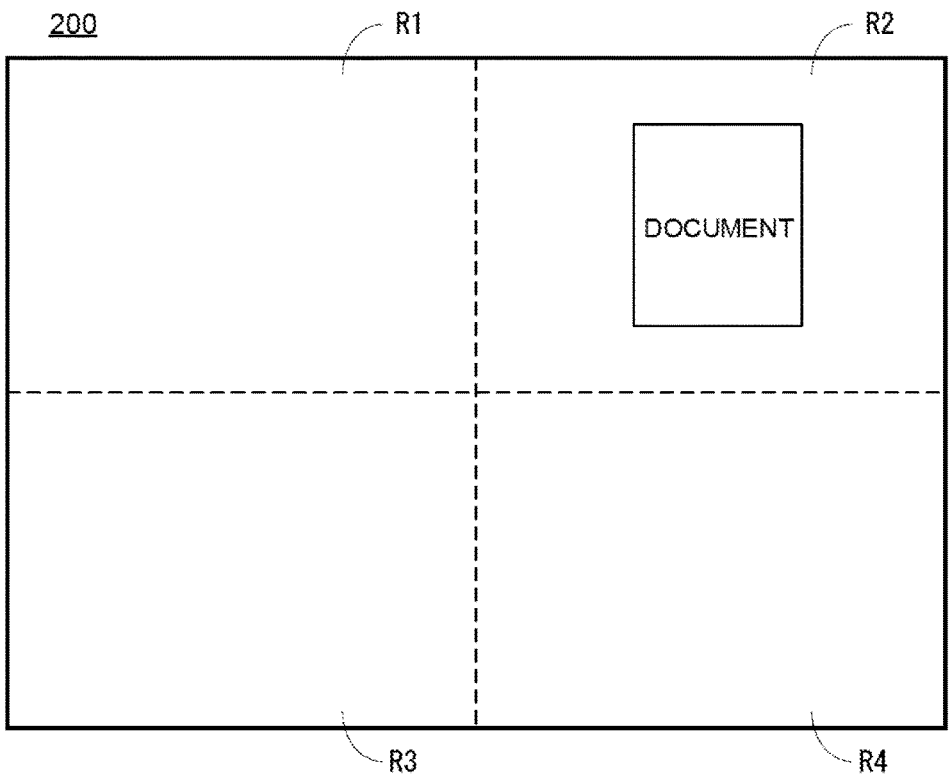
Figure 19:
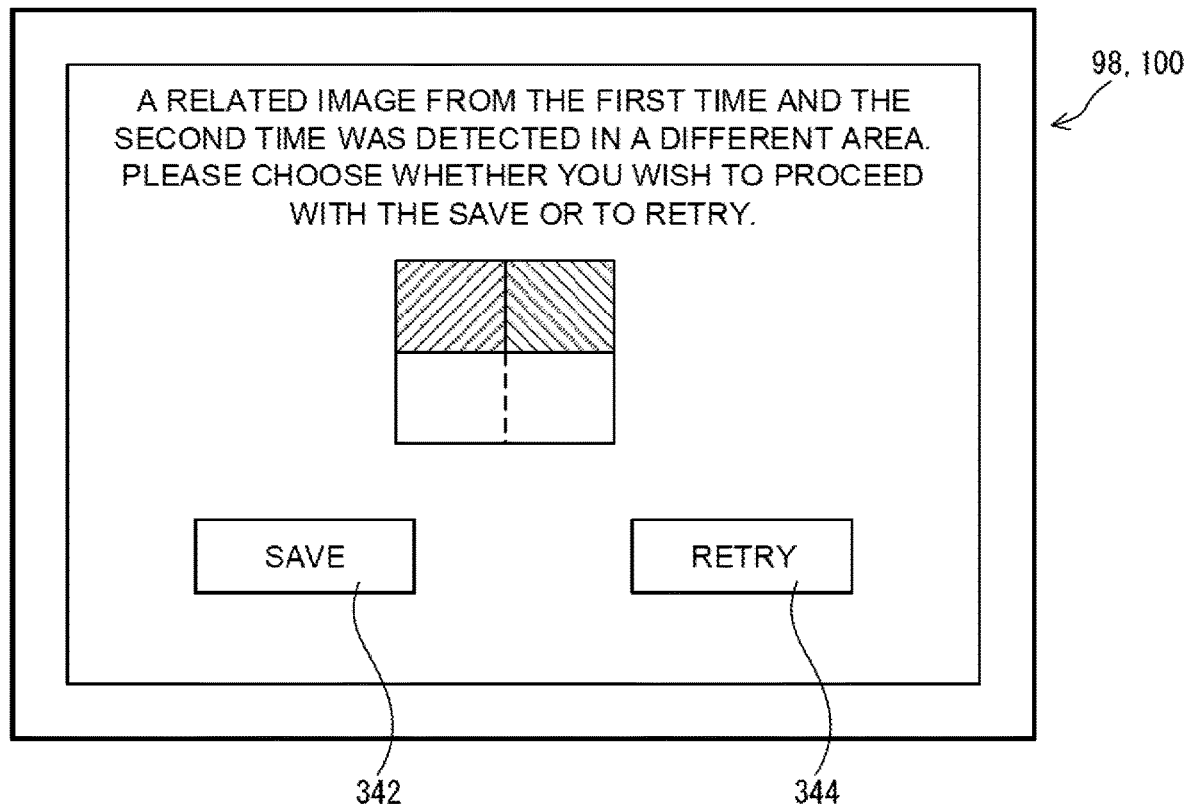
FIG. 19 is an illustrative view showing an example of a fifth notification screen.

Hereinafter, an operation of the image reading device 14 (image forming device 10) in a case where there has been a change in document characteristics in each time of the read processing will be described with reference to FIG. 14 to FIG. 19. FIG. 14 is a diagram showing an example of a state where documents having different sizes are placed in the same divided area in the first time and the second time. FIG. 15 is an illustrative view showing an example of a third notification screen 280. FIG. 16 is a diagram showing an example of a state a different number of documents are placed in the same divided area in the first time and the second time. FIG. 17 is an illustrative view showing an example of a fourth notification screen 320. FIG. 18 is a diagram showing an example of a state where the same document is placed in a different divided area in the first time and the second time. FIG. 19 is an illustrative view showing an example of a fifth notification screen 340.

For example, documents having different sizes (areas) are sometimes placed in a certain divided area (for example, the divided area R1) in the first time and the second time as shown in FIG. 14. Here, the size of the individual image generated in the first time of read processing (first document size) and the size of the individual image generated in the second time of read processing (second document size) are compared to determine whether or not the document size is different in the first time and the second time. Note that whether or not the first document size and the second document size are different is determined based on whether or not an area ratio between the first document size and the second document size is greater than or equal to a predetermined threshold T. For example, the threshold T is approximately 0.95. Therefore, if the document in the first time and the document in the second time have a mutual size difference within 5%, they are determined to be the documents of the same size. If they have a mutual size difference of greater than 5%, they are determined to be documents of different sizes. The numerical value of the threshold T is an example. It can be changed to match the usage status of the image reading device 14 (image forming device 10) and the like.

In the second embodiment, when documents having different sizes are placed in a certain divided area in the first time and the second time, as shown in FIG. 15, a third notification screen 280 for notifying this to the user is displayed on the display 100.

The third notification screen 280 is provided with a message indicating that documents having different sizes were placed in a certain divided area in the first time and the second time, a message for selecting whether or not scanning (that is to say, generation of an image file) is to be continued, a diagram indicating the divided area in which documents having different sizes were placed in the first time and the second time, a first key 282, and a second key 284.

When the first key 282 is touched, the image file data is updated as it is by each divided area. This is because the user may sometimes intentionally place documents having different sizes.

On the other hand, when the second key 284 is touched, scanning is cancelled and the process returns to the state prior to performing the first read instruction. When the third notification screen 280 is displayed and the second key 284 is touched in the second and subsequent times of read processing, the process may return to the state prior to performing the latest read instruction. This is identical for the second keys 324, and 344 described below.

Next, a case where the number of documents placed in a certain divided area in each time of the read processing is different will be described with reference to FIG. 16. In the example shown in FIG. 16, the number of documents in the divided area R1 in the first time of read processing is one. In contrast, the number of documents in the second time of read processing is two. In this case, there is a possibility that, in the second time of read processing, the user has accidentally placed an unnecessary document in the divided area R1.

As described in the first embodiment, when there is a divided area in which a plurality of documents have been placed, an individual image corresponding to one of the documents among the plurality of documents is saved, or the read processing is repeated. Therefore, the number of documents when the first time of read processing has been performed is usually one. Consequently, a difference in the number of documents placed in a certain divided area in each time of the read processing represents either a case where there are no documents placed in the certain divided area in the second and subsequent times of read processing, or a case where the number of documents becomes two or more.

In the second embodiment, when the number of documents placed in a certain divided area in each time of the read processing is different, as shown in FIG. 17, a fourth notification screen 320 for notifying this to the user is displayed on the display 100.

The fourth notification screen 320 is provided with a message indicating that the number of documents detected (extracted) in a certain divided area is different in the first time and the second time, a message for selecting whether or not scanning (that is to say, generation of an image file) is to be continued, a diagram indicating the divided area in which the difference in the number of documents occurred in the first time and the second time, a first key 322, and a second key 324.

When the first key 322 is touched, one of the individual images among the plurality of images is set as an association candidate. The method of setting the association candidate in a case where a plurality of documents is included in a divided area is identical to the method described in the first embodiment. Therefore, the description is omitted. Further, a selection screen such as that shown in FIG. 9 is displayed, and the individual image set as the association candidate is presented to the user. The user is capable of selecting whether to save the individual image or to repeat read processing.

On the other hand, when the second key 324 is touched, scanning is cancelled and the process returns to the state prior to performing the first read instruction.

Next, a case where related documents are placed in different divided areas in each time of the read processing as shown in FIG. 18 will be described. In the example shown in FIG. 18, a document having the same size as a document placed in a certain divided area (for example, the divided area R1) in the first time of read processing is placed in a different divided area (for example, the divided area R2) in the second time of read processing. In this case, in the divided area R1 and the divided area R2, in which the document is placed in the first time and the second time, it is determined that the size of the document is different in the first time and the second time. Further, it is determined that the number of documents that have been placed is different in the first time and the second time. Note that, in this case, there is a possibility that the user has accidentally placed the document intended to be placed in the divided area R1 in the divided area R2.

In the second embodiment, when a document having the same size as a document placed in a certain divided area in the first time of read processing is placed in a different divided area in the second time of read processing, that is to say, when an individual image corresponding to a related document is placed in different divided areas in the first time of read processing and the second time of read processing, as shown in FIG. 19, a fifth notification screen 340 for notifying this to the user is displayed on the display 100. Whether or not the compared document sizes are the same is determined based on whether or not an area ratio between the first document size and the second document size is greater than or equal to the threshold T described above The fifth notification screen 340 is provided with a message indicating that a related document has been placed in different divided areas in the first time of read processing and the second time of read processing, a message for selecting whether or not scanning is to be continued, a diagram indicating the divided areas in which the related document was placed in the first time of read processing and the second time of read processing, a first key 342, and a second key 344.

When the first key 342 is touched, the image file data is updated as it is by each divided area. Note that, rather than updating the image file data for each divided area as usual, when the first key 342 is touched, it is possible for the individual image data relating to an individual image corresponding to a document determined as being a related document in the first time of read processing and the second time of read processing to be collected into the data of a single image file. In this case, the individual image data corresponding to the document placed in the divided area generated in the current read processing is added to the image file data for the divided area R1 generated in the previous read processing. It is set in advance whether the image file data is updated for each divided area as usual or the individual image data relating to the individual image determined as being related is collected into the data of a single image file when the first key 342 is touched. This setting can be changed according to the usage status of the image reading device 14 (image forming device 10) and the like.

On the other hand, when the second key 344 is touched, scanning is cancelled and the process returns to the state prior to performing the first read instruction.

A case was described above where a plurality of times of read processing is executed. However, because a case where just a single time of read processing is executed is identical to the first embodiment described above, the description is omitted. Furthermore, although a detailed description is omitted, area straddling confirmation processing is executed in each time of the read processing.

Furthermore, in the second embodiment, the control programs further include a program for determining whether or not the size of a document placed in a certain divided area is different in each time of the read processing, a program for determining whether or not the number of documents placed in a certain divided area is different in each time of the read processing, and a program for determining whether or not a related document has been placed in different divided areas in the first time of read processing and the second time of read processing.

Hereinafter, read processing according to the second embodiment will be described using flow diagrams. However, the same reference symbols are assigned to the same processing as that of the read processing described in the first embodiment. Further, the description of duplicated content will be omitted, or described only briefly.

Figure 20:
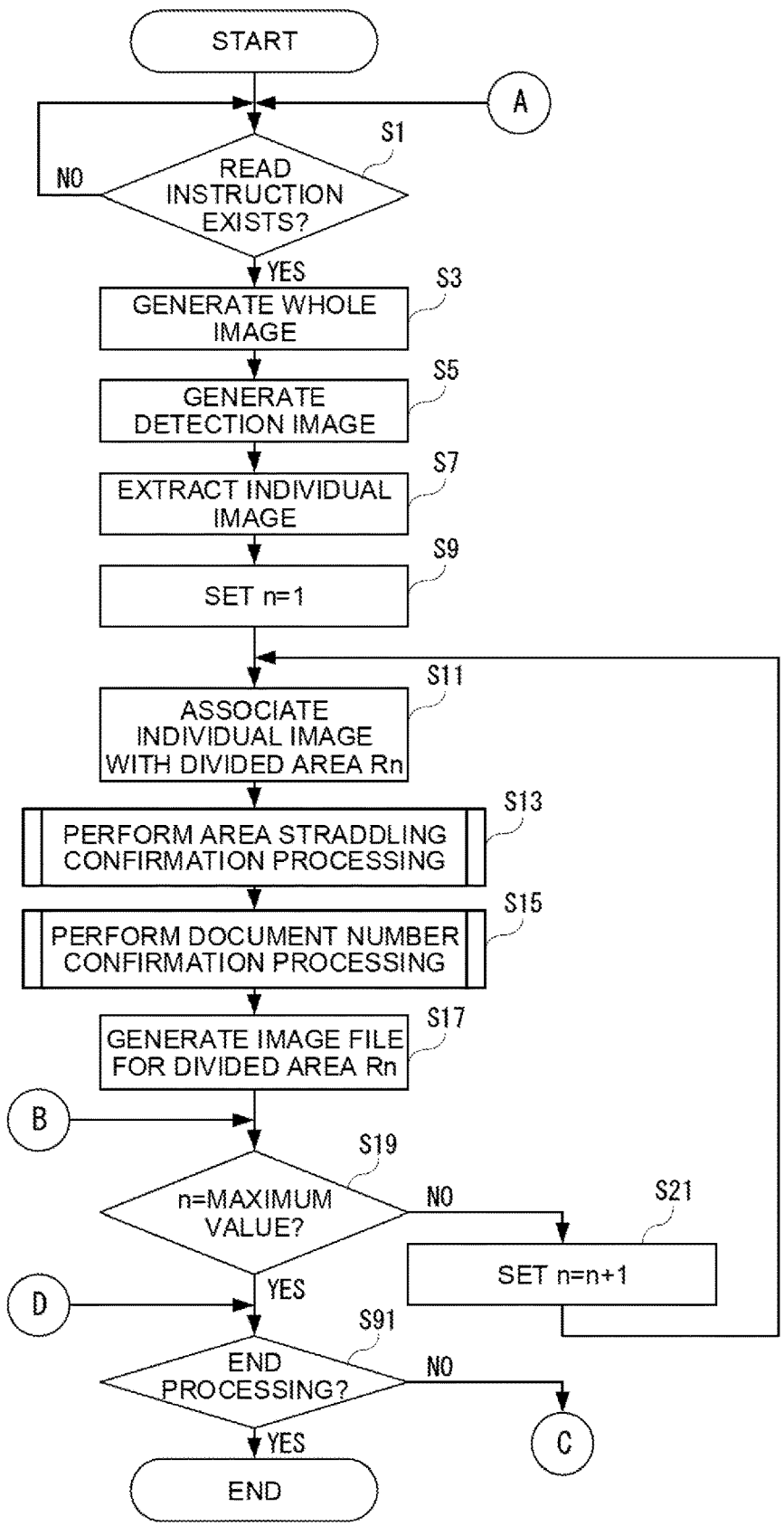
FIG. 20 is a flow diagram showing part of an example of read processing according to a second embodiment.
Figure 21:
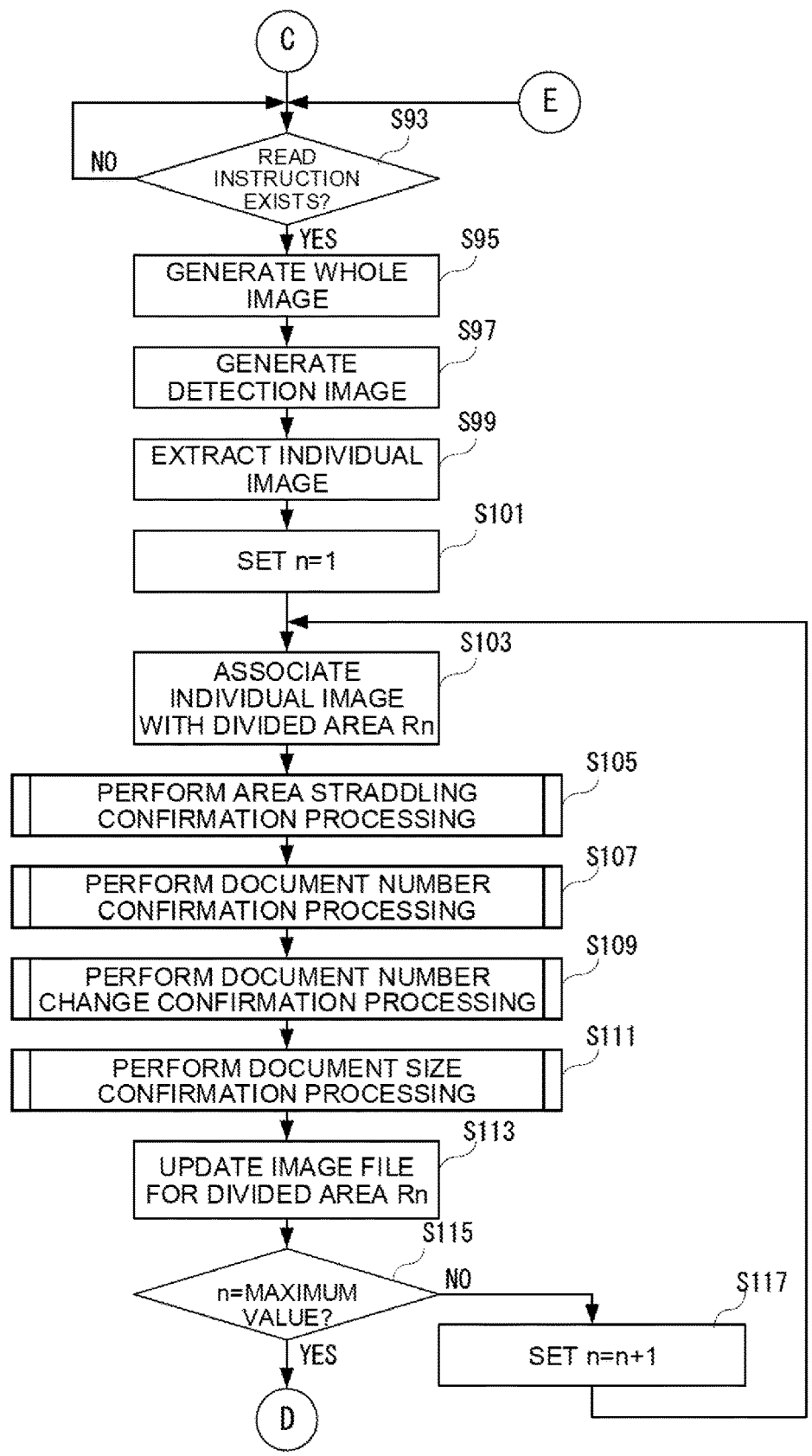
FIG. 21 is a flow diagram showing part of the read processing according to the second embodiment, and follows on from FIG. 20.

FIG. 20 is a flow diagram showing part of an example of read processing according to the second embodiment. FIG. 21 is a flow diagram showing part of an example of read processing according to the second embodiment, and follows on from FIG. 20. As shown in FIG. 20, when the CPU 80 starts the read processing, if the result of step S19 is "YES", it is determined in step S91 whether or not read processing is to be ended. Here, it is determined whether or not an end key assigned a function to end document reading has been touched. If the result of step S91 is "YES", that is to say, if it is determined that read processing is to be ended, the read processing ends. On the other hand, if the result of step S91 is "NO", that is to say, if it is determined that a subsequent read is to be performed, it is determined in step S93 shown in FIG. 21 whether or not a read instruction exists. The processing in each of the steps S93 to S107 is the same as the processing in each of the steps S1 to S15 in the read processing of the first embodiment. Therefore, a detailed description is omitted.

In step S109, document number change confirmation processing is performed with respect to the divided area Rn. Then, in step S111, document size confirmation processing is performed. In step S113 the individual image associated with the divided area Rn is added to the image file relating to the divided area Rn, that is to say, the image file relating to the divided area Rn is updated. Then, in step S115, it is determined whether the variable n is the maximum value (4 in the second embodiment). If the result of step S115 is "NO", in step S117 the variable n is incremented by 1. Then, the process returns to step S103. On the other hand, if the result of step S115 is "YES", the process returns to step S91 shown in FIG. 20.

Figure 22:
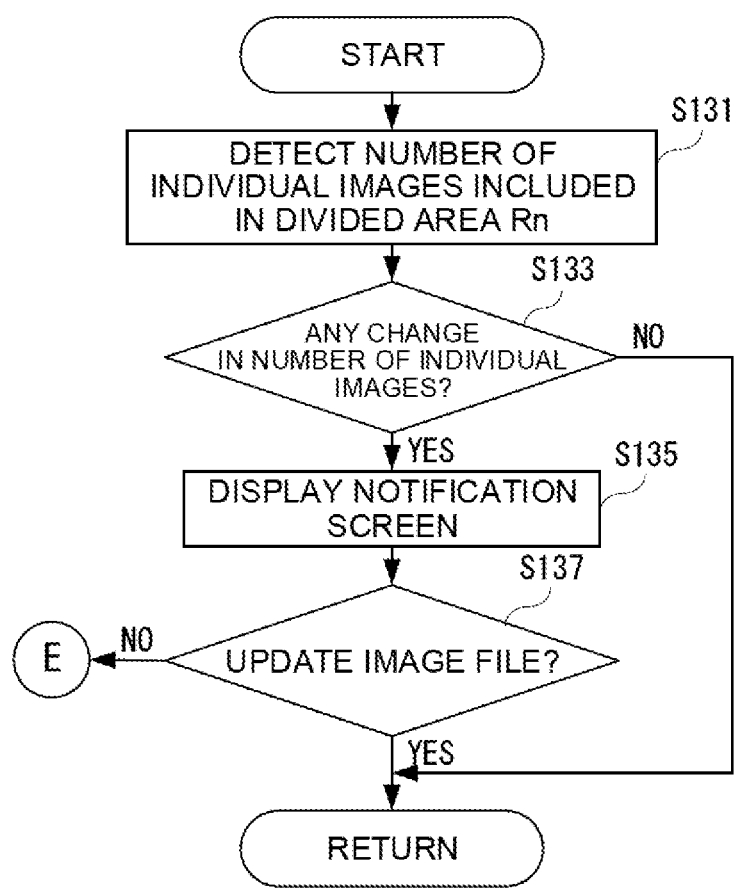
FIG. 22 is a flow diagram showing an example of document number change confirmation processing according to the second embodiment.

FIG. 22 is a flow diagram showing an example of document number change confirmation processing performed by the CPU 80 shown in FIG. 2. For example, the flow of the document number change confirmation processing is a subroutine executed in step S109 of the read processing described above.

As shown in FIG. 22, when the CPU 80 starts the document number change confirmation processing, it detects in step S131 the number of individual images included in the divided area Rn. Here, the number of individual images included in the divided area Rn is detected according to the positions of the divided area Rn and of the extracted individual images.

Next, in step S133, it is determined whether or not the number of individual images included in the divided area Rn is different from the number of individual images included in the divided area Rn in the other times of read processing. If the result of step S133 is "NO", that is to say, if it is determined that the number of individual images included in the divided area Rn is the same as the number of individual images included in the divided area Rn in the other times of read processing, the flow of document number change confirmation processing ends, and the process returns to the read processing. On the other hand, if the result of step S133 is "YES", that is to say, if it is determined that the number of individual images included in the divided area Rn is different from the number of individual images included in the divided area Rn in the other times of read processing, in step S135 a notification screen (for example, the fourth notification screen 320) for notifying the user that the number of documents placed in a certain divided area is different in each time of the read processing is displayed on the display 100. Then, in step S137, it is determined whether or not the image file is to be updated. Here, it is determined whether or not a key that instructs the image file to be updated (for example, the first key 322) has been touched on the notification screen.

If the result of step S137 is "NO", that is to say, if it is determined that the image file is not to be updated, the flow of the document number change confirmation processing ends, and the process returns to step S93 of the read processing. On the other hand, if the result of step S137 is "YES", that is to say, if it is determined that the image file is to be updated, the same processing as steps S51 to S73 of the document number confirmation processing described above is performed. Further, the individual image set as the association candidate for the divided area Rn is associated with the divided area Rn. Then, the flow of the document number change confirmation processing ends, and the processing returns to the read processing.

Figure 23:
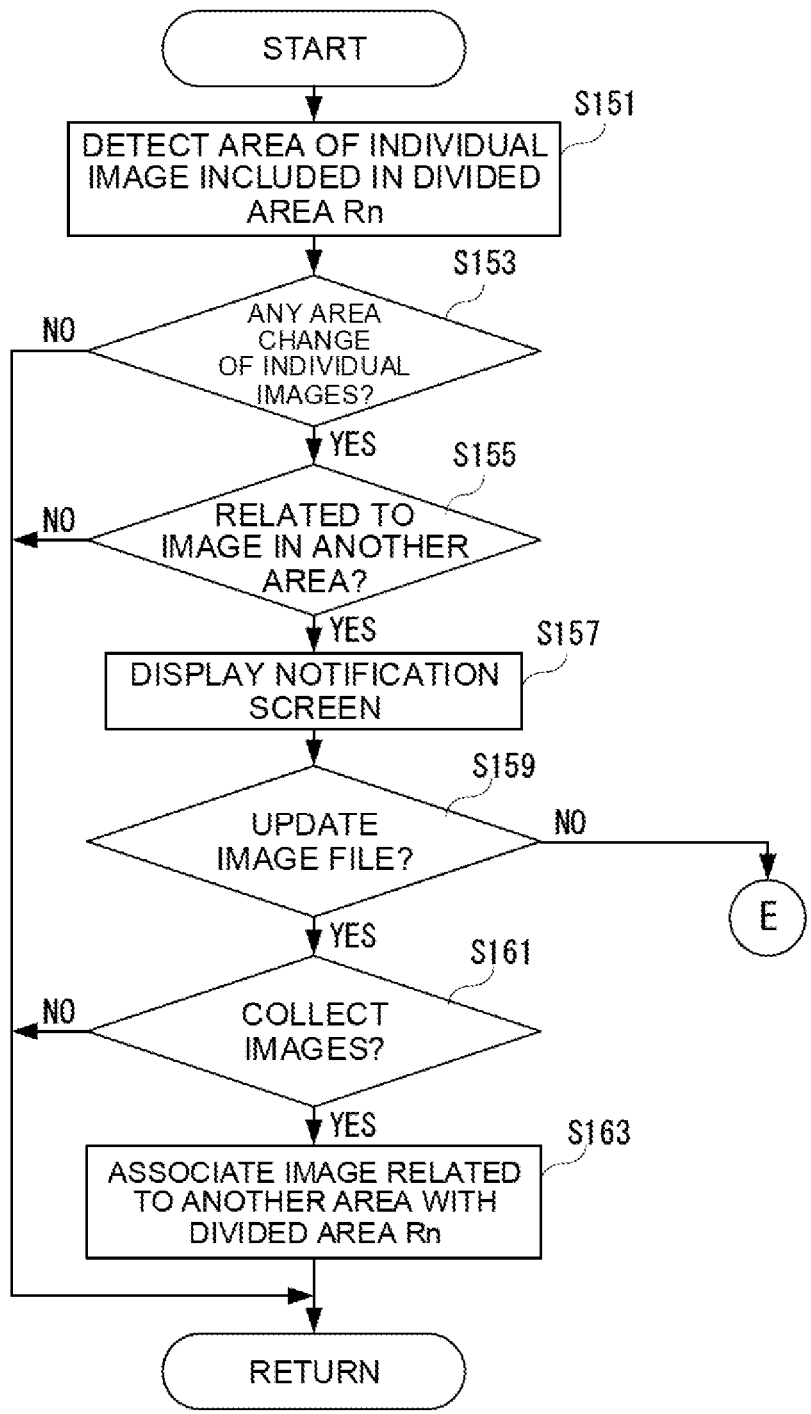
FIG. 23 is a flow diagram showing an example of association processing according to the second embodiment.

FIG. 23 is a flow diagram showing an example of document size confirmation processing performed by the CPU 80 shown in FIG. 2. For example, the flow of the document size confirmation processing is a subroutine executed in step S111 of the read processing described above.

As shown in FIG. 23, when the CPU 80 starts the document size confirmation processing, it calculates in step S151 the area of the individual image included in the divided area Rn. Next, in step S153, it is determined whether or not there has been the area change of the individual image included in the divided area Rn, that is to say, whether or not the area of the individual image included in the divided area Rn is different from the area of the individual image included in the divided area Rn in the other times of read processing.

If the result of step S153 is "NO", that is to say, if it determined that there is no area change of the individual image included in the divided area Rn, the flow of the document size confirmation processing ends, and the process returns to the read processing. If the result of step S153 is "YES", that is to say, if it determined that there has been the area change of the individual image included in the divided area Rn, in step S155 it is determined whether or not the individual image is related to an individual image included in another area.

If the result of step S155 is "NO", that is to say, if it determined that the individual image is not related to an individual image included another area, the flow of the document size confirmation processing ends, and the process returns to the read processing. On the other hand, if the result of step S155 is "YES", that is to say, if it is determined that the individual image is related to an individual image included in another area, in step S157 a notification screen (for example, the fifth notification screen 340) for notifying the user that a related document has been placed in different divided areas in the first time of read processing and the second time of read processing is displayed on the display 100. Then, in step S159, it is determined whether or not the image file is to be updated. Here, it is determined whether or not a key that instructs the image file to be updated (for example, the first key 342) has been touched on the notification screen. If the result of step S159 is "NO", the flow of the document size confirmation processing ends, and the process returns to step S93 of the read processing.

On the other hand, if the result of step S159 is "YES", in step S161 it is determined whether or not the individual image of the other area determined as being related is to be collected as data of a single image file. If the result of step S161 is "NO", the flow of the document size confirmation processing ends, and the process returns to the read processing. On the other hand, if the result of step S161 is "YES", the individual image of the other area determined as being related is associated with the divided area Rn. Then, the flow of the document size confirmation processing ends, and the process returns to the read processing.

According to the second embodiment, if there is a change in the document characteristics in each time of the read processing in each divided area, the user is notified of this before the image file data is generated. Therefore, user burden can be reduced when a read error occurs.

Furthermore, according to the second embodiment, if the number of documents placed in a certain divided area is different in each time of the read processing, the user is notified of this before the image file data is generated. Therefore, user burden can be reduced.

In addition, according to the second embodiment, if the size of the document placed in a certain divided area is different in each time of the read processing, the user is notified of this before the image file data is generated. Therefore, user burden can be reduced.

The specific configurations and the like presented in the embodiment above are examples, and can be appropriately changed according to an actual product. Furthermore, the order in which the steps in the flow diagrams presented in the embodiment above are processed may be appropriately changed if the same results can be obtained.

In addition, in the embodiments above, the notification screens display the divided area subject to the read error and the individual image included in the divided area. However, the entire read area and the individual images included therein may also be displayed. Also, if a plurality of times of the read processing is executed, the entire read area and the individual images included therein may be displayed in each execution time.

What is claimed is:
1. An image reading device, comprising:
a processor,
wherein the processor executes:
a whole image generator that divides a read area of a document placement table into a plurality of areas, multiple times executes read processing that collectively reads an image of a document in the plurality of areas, and generates a whole image that corresponds to a whole of the plurality of areas in each read processing;

an extractor that extracts an individual image corresponding to the document from the whole image;

an image file generator that generates a plurality of image files in which a plurality of individual images acquired by executing each read processing are collected by the plurality of areas;

a second determiner that determines, based on the plurality of individual images acquired by executing the each read processing and collected by the plurality of areas, whether or not there is an area among the plurality of areas, in which a document characteristic has changed in the each read processing; and a notifier that notifies a user that there is the area in which the document characteristic has changed in the each read processing if the second determiner determines that there is the area in which the document characteristic has changed in the each read processing.

2. The image reading device according to claim 1, wherein the second determiner determines, based on a number of the individual images for the plurality of areas included in the plurality of image files, whether or not there is the area among the plurality of areas, the notifier notifies the user that there is the in which a number of documents has changed in the each read processing if the second determiner determines that there is the area in which the number of documents has changed in the each read processing.

3. The image reading device according to claim 1, wherein the second determiner determines, based on a size of the individual images for the plurality of areas included in the plurality of image files, whether or not there is the document whose size has changed in the each read processing; and the notifier notifies the user that there is the document whose the size has changed if the second determiner determines that there is the document whose the size has changed.

4. A control method of an image reading device that divides a read area of a document placement table into a plurality of areas, multiple times executes read processing that collectively reads an image of a document in the plurality of areas, and generates a whole image that corresponds to a whole of the plurality of areas in each read processing, the control method comprising:

(a) extracting an individual image corresponding to the document from the whole image;

(b) generating a plurality of image files in which a plurality of individual images acquired by executing the each read processing are collected by the plurality of areas;

(c) determining, based on the plurality of individual images acquired by, executing the each read processing and collected by the plurality of areas, whether or not there is an area among the plurality of areas, in which a document characteristic has changed in the each read processing; and (d) notifying a user that there is the area in which the document characteristic has changed in the each read processing.

* * * * *

UNITED STATES PATENT AND TRADEMARK OFFICE
CERTIFICATE OF CORRECTION

PATENT NO. : 10,992,835 B2
APPLICATION NO. : 16/686568
DATED : April 27, 2021
INVENTOR(S) : Naoya Arifuku Page 1 of 1

It is certified that error appears in the above-identified patent and that said Letters Patent is hereby corrected as shown below:

On the Title Page

Add the following text:
(30) Foreign Application Priority Data
Nov. 20 2018(JP).............2018-217343

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*